United States Patent
Vangala et al.

(10) Patent No.: US 12,224,920 B2
(45) Date of Patent: Feb. 11, 2025

(54) MANAGING QUALITY OF EXPERIENCE IN COMMUNICATIONS NETWORKS

(71) Applicant: Apple Inc., Cupertino, CA (US)

(72) Inventors: Sarma V. Vangala, Campbell, CA (US); Seyedamirhossein Hosseini, San Diego, CA (US); Sreevalsan Vallath, Dublin, CA (US); Tarik Tabet, Carlsbad, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/244,947

(22) Filed: Sep. 12, 2023

(65) Prior Publication Data

US 2024/0089183 A1 Mar. 14, 2024

Related U.S. Application Data

(60) Provisional application No. 63/405,562, filed on Sep. 12, 2022.

(51) Int. Cl.
*H04L 41/5067* (2022.01)

(52) U.S. Cl.
CPC .............................. *H04L 41/5067* (2013.01)

(58) Field of Classification Search
CPC .. H04L 41/5067; H04L 41/50; H04L 41/5009; H04L 41/5019; H04L 41/5025; H04L 43/08; H04L 43/0813; H04L 43/0823; H04L 43/091
See application file for complete search history.

(56) References Cited

U.S. PATENT DOCUMENTS

| | | | |
|---|---|---|---|
| 9,654,527 B1* | 5/2017 | Narayanan | H04L 65/80 |
| 10,791,026 B2* | 9/2020 | Tomkins | H04L 41/142 |
| 2005/0089043 A1* | 4/2005 | Seckin | H04L 65/80 370/395.21 |
| 2010/0268524 A1* | 10/2010 | Nath | H04L 67/306 709/224 |
| 2010/0268834 A1* | 10/2010 | Eidelman | H04L 41/5096 709/230 |
| 2010/0315968 A1* | 12/2010 | Zhou | H04L 1/0009 370/252 |
| 2011/0306305 A1* | 12/2011 | Huang | H04W 24/08 455/67.11 |
| 2013/0148525 A1* | 6/2013 | Cuadra Sanchez | H04L 41/5067 370/252 |
| 2013/0263167 A1* | 10/2013 | Parthasarathy | H04L 41/5067 455/406 |

(Continued)

*Primary Examiner* — David R Lazaro
(74) *Attorney, Agent, or Firm* — Fish & Richardson P.C.

(57) ABSTRACT

A method for managing a QoE for a UE in a communications network is provided. The method includes determining, based at least on data received in a communications session, one or more parameters affecting the QoE. The method includes determining weights corresponding to the one or more parameters. The method includes computing an expected QoE for the UE based on the determined weights corresponding to the one or more parameters. The method includes determining that the expected QoE satisfies a threshold. The method includes transmitting, to one or more network nodes in the communications network, the determined weights corresponding to the one or more parameters. The method also includes adjusting the communications session at the UE.

20 Claims, 13 Drawing Sheets

(56) References Cited

U.S. PATENT DOCUMENTS

| | | | | |
|---|---|---|---|---|
| 2013/0298170 | A1* | 11/2013 | ElArabawy | H04L 47/2416 |
| | | | | 725/62 |
| 2014/0269269 | A1* | 9/2014 | Kovvali | H04W 24/04 |
| | | | | 370/252 |
| 2015/0373565 | A1* | 12/2015 | Safavi | H04L 41/5067 |
| | | | | 370/252 |
| 2016/0135104 | A1* | 5/2016 | Lau | H04W 36/304 |
| | | | | 455/436 |
| 2016/0296840 | A1* | 10/2016 | Kaewell | H04L 41/5025 |
| 2016/0344606 | A1* | 11/2016 | Baccarani | H04L 41/5067 |
| 2016/0373324 | A1* | 12/2016 | Gholmieh | H04L 65/611 |
| 2018/0091386 | A1* | 3/2018 | Lundberg | H04L 41/147 |
| 2018/0288635 | A1* | 10/2018 | Kaushik | H04W 28/20 |
| 2020/0169457 | A1* | 5/2020 | Xiao | H04L 41/5009 |
| 2020/0351718 | A1* | 11/2020 | Dong | H04W 28/0252 |
| 2020/0412866 | A1* | 12/2020 | Bleiholder | H04L 41/5067 |
| 2021/0089438 | A1* | 3/2021 | Gardner | G06F 11/3688 |
| 2021/0234773 | A1* | 7/2021 | Maggiore | H04L 41/5009 |
| 2021/0385724 | A1* | 12/2021 | Wang | H04L 41/5051 |
| 2022/0022061 | A1* | 1/2022 | Hariharan | H04B 17/345 |
| 2022/0046447 | A1* | 2/2022 | Pedersen | G06N 3/08 |
| 2022/0053380 | A1* | 2/2022 | Krishnan | H04L 41/5067 |
| 2022/0286369 | A1* | 9/2022 | Lee | H04L 41/5009 |
| 2022/0377844 | A1* | 11/2022 | Kumar | H04W 88/08 |
| 2022/0417972 | A1* | 12/2022 | Rossbach | H04W 72/20 |
| 2023/0068143 | A1* | 3/2023 | Vobilishetti | H04L 1/1861 |
| 2023/0403224 | A1* | 12/2023 | Roy | H04L 43/0817 |
| 2024/0089183 | A1* | 3/2024 | Vangala | H04L 41/5067 |

\* cited by examiner

MANAGING QUALITY OF EXPERIENCE IN COMMUNICATIONS NETWORKS

CROSS REFERENCE TO RELATED APPLICATIONS

This application claims priority to U.S. Provisional Patent Application No. 63/405,562, filed Sep. 12, 2022, the content of which is incorporated hereby by reference.

BACKGROUND

Wireless communications networks provide integrated communication platforms and telecommunication services to wireless user devices. Example telecommunication services include telephony, data (e.g., voice, audio, and/or video data), messaging, internet-access, and/or other services. The wireless communications networks have wireless access nodes that exchange wireless signals with the wireless user devices using wireless network protocols, such as protocols described in various telecommunication standards promulgated by the Third Generation Partnership Project (3GPP). Example wireless communications networks include time division multiple access (TDMA) networks, frequency-division multiple access (FDMA) networks, orthogonal frequency-division multiple access (OFDMA) networks, Long Term Evolution (LTE), and Fifth Generation (5G) New Radio (NR). The wireless communications networks facilitate mobile broadband service using technologies such as OFDM, multiple input multiple output (MIMO), advanced channel coding, massive MIMO, beamforming, and/or other features.

SUMMARY

Disclosed are methods, systems and apparatus to manage Quality of Experience (QoE) in communication networks. In general, QoE measures a user's subjective experience, e.g., delight, annoyance, satisfaction, or dissatisfaction, with a service. In the area of telecommunications, QoE describes a user's experience with a communications session that is established between the user device, such as a user equipment (UE), and other devices, such as an end device (which can be, for example, another UE or a server) in the wireless communications network.

In accordance with one aspect of the present disclosure, a method for managing a QoE for a UE in a communications network is provided. The method includes determining, based at least on data received in a communications session, one or more parameters affecting the QoE. The method includes determining weights corresponding to the one or more parameters. The method includes computing an expected QoE for the UE based on the determined weights corresponding to the one or more parameters. The method includes determining that the expected QoE satisfies a threshold. The method includes transmitting, to one or more network nodes in the communications network, the determined weights corresponding to the one or more parameters. The method also includes adjusting the communications session at the UE.

In accordance with one aspect of the present disclosure, a processor has circuitry that executes instructions to cause a network node to perform operations. The operations include receiving, from a UE that communicates with the network node in a communications network, one or more weights corresponding to one or more parameters, wherein the one or more parameters affect a QoE for the UE. The operations include determining, based at least on a condition of the network node, updated weights corresponding to the one or more parameters. The operations include transmitting, to an end device, the updated weights corresponding to the one or more parameters.

In accordance with one aspect of the present disclosure, a UE in a communications network is provided. The UE includes a processor. The processor is configured to determine, based at least on data received in a communications session, one or more parameters affecting QoE of the UE. The processor is configured to determine weights corresponding to the one or more parameters. The processor is configured to compute an expected QoE for the UE based on the determined weights corresponding to the one or more parameters. The processor is configured to determine that the expected QoE satisfies a threshold. The processor is configured to cause transmission, to one or more network nodes in the communications network, the determined weights corresponding to the one or more parameters. The processor is configured to adjust the communications session at the UE.

In accordance with one aspect of the present disclosure, a method for managing a QoE for a UE in a communications network is provided. The method includes receiving, from the UE, one or more weights corresponding to one or more parameters, wherein the one or more parameters affect a QoE of the UE. The method includes determining, based at least on a condition of a network node, updated weights corresponding to the one or more parameters. The method includes transmitting, to an end device, the updated weights corresponding to the one or more parameters.

In accordance with one aspect of the present disclosure, an end device having a processor is provided. The processor is configured to cause the end device to communicate with a UE in a communications network that comprises one or more network nodes. The processor is configured to cause the end device to receive, from the one or more network nodes, one or more weights corresponding to one or more parameters, wherein the one or more parameters affect a QoE of the UE. The processor is configured to calculate a QoE value based at least on the one or more parameters and the corresponding weights. The processor is configured to determine to adjust the QoE of the UE based at least on the QoE value. The processor is configured to adjust a communications session between the end device and the UE.

In accordance with one aspect of the present disclosure, a method for managing a QoE for a UE in a communications network is provided. The method includes receiving, by an end device and from one or more network nodes in the communications network, one or more weights corresponding to one or more parameters, wherein the one or more parameters affect a QoE of the UE. The method includes calculating a QoE value based at least on the one or more parameters and the corresponding weights. The method includes determining an adjustment to the QoE of the UE based at least on the QoE value. The method includes adjusting a communications session between the end device and the UE based at least on the adjustment to the QoE.

The details of one or more implementations of these systems and methods are set forth in the accompanying drawings and the description below. Other features, objects, and advantages of these systems and methods will be apparent from the description and drawings, and from the claims.

DETAILED DESCRIPTION

Figure 1:
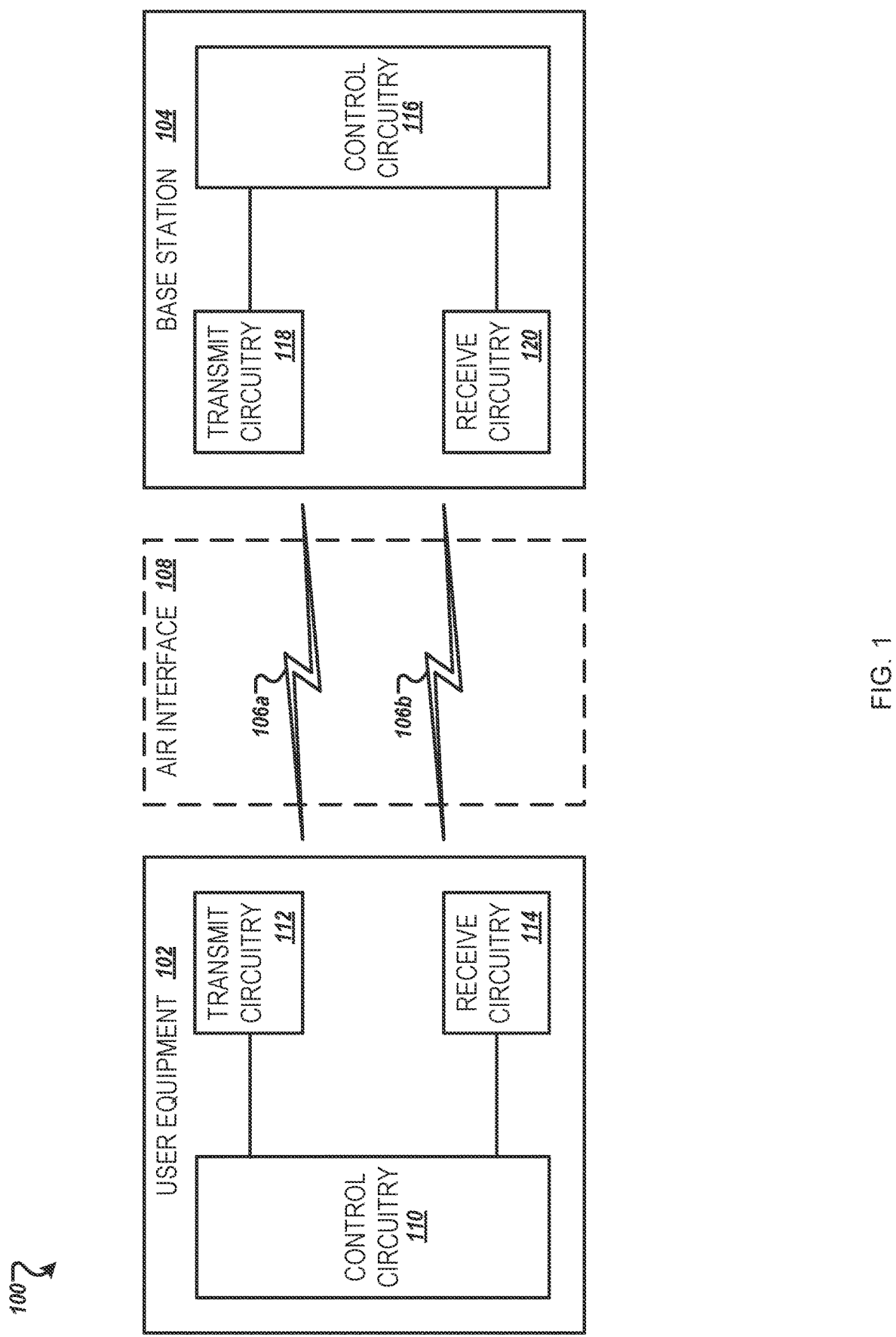
FIG. 1 illustrates a wireless access network, according to some implementations.

The techniques disclosed in this specification describe a framework for managing QoE of a user device, such as a UE, during a communications session in a wireless communications network, such as a cellular network. In the following sections, the techniques are described with respect to a UE that communicates with an end device (which can be another UE, a server, or some other suitable electronic device) during a communications session in a wireless communications network. The communications session is established through one or more intermediate network nodes, which can be, for example, a base station in a cellular radio access network (RAN). However, it should be understood that the disclosed techniques are also applicable to other types of user devices, intermediate network nodes, or end devices.

QoE can be affected by factors relating to the network, such as latency and congestion, resource availability at the end device or intermediate network nodes (which can be, for example, a base station or other access node), as well as factors related to the user device itself, such as availability of computing resources at the user device. Existing frameworks for QoE management often involve a centralized mechanism, based on a unilateral QoE adjustment by the network based on metric reporting by a UE. These frameworks typically do not provide the network's reaction to a particular UE's request, and typically there is no provision for the two ends of the communications session (e.g., the UE and the end device), to negotiate mutually acceptable QoE parameters. Accordingly, the UE requesting QoE adjustment may not timely know what QoE adjustment to expect. Existing QoE frameworks thus do not typically support dynamic (e.g., during the communications session) QoE adjustment based on the UE's request. Similarly, these frameworks often do not support dynamic upgrades or downgrades of a service subscription based on a UE's request. For example, a user watching a video from a subscribed streaming service may not be able to dynamically request that the video be streamed in a different format, e.g., with a different resolution, that was not in the user's original subscription. Similarly, the streaming service provider may not be able to provide a plan that allows the user to dynamically change subscription, e.g., from 100 Mbps for next 3 days to 10 Mbps for the next month) on an on-the-fly basis.

Such lack of flexibility in existing QoE frameworks can make it challenging to handle resource-intensive services, e.g., those that involve communications sessions measured on sub-10 milli-second (ms) and sub-ms timescales, or high data rates, among others. As these fast-speed services become more common in today's and future communication technologies, it can be beneficial to have a UE negotiate with the other end device in a communications session to dynamically determine mutually-acceptable QoE metrics. It is also desirable to have the intermediate nodes involved in the communications session (e.g., access nodes, such as base stations or RAN edge nodes) participate in the negotiation so that the network condition is considered in adjusting the QoE experienced by the requesting UE.

As described in detail below, implementations of the novel techniques in this disclosure provide a framework or system that allows bidirectional, end-to-end (E2E) QoE negotiation of QoE parameters for an ongoing communications session, with network condition taken into consideration by using intermediate nodes in the network update requested QoE metrics based on network conditions. One or more implementations also use artificial intelligence (AI) techniques, such as machine learning (ML), to facilitate the determination of QoE parameters, either at the UE or at the intermediate node(s), or both.

As described in greater detail below, in the disclosed techniques, a UE determines adjustments to one or more parameters that affect an estimated QoE at the UE during a communications session with an end device, and sends a request for QoE adjustment to an intermediate network node in the network. Upon receiving the request from the UE, the intermediate node evaluates QoE needs of various UEs serviced by the intermediate node, resource availability at the intermediate node, and the network status, to update parameters for the requested QoE adjustment. The intermediate node then forwards the parameters to the end device, potentially through one or more other intermediate nodes, one or more of which themselves make further adjustments to the QoE parameters. The end device updates the characteristics for the communications session upon receiving the requested parameters. With the features described below, the disclosed framework supports robust and efficient communications with flexible QoE adjustment in a dynamic loop, thereby making the overall process more observable to the user and allowing the service provider to provide a subscription model that fits the customer' needs.

FIG. 1 illustrates a wireless access network 100, according to some implementations. The wireless access network 100 includes a UE 102 and a base station 104 connected via one or more channels 106A, 106B across an air interface 108. The UE 102 and base station 104 communicate using a system that supports controls for the access of the UE 102 to a network via the base station 104. Base station 104 is an example of an intermediate node that operates a communications session between UE 102 and an end device, and UE 102 is an example of a user device that requests QoE adjustment in the communications session.

In some implementations, the wireless network 100 may be a Non-Standalone (NSA) network that incorporates LTE and 5G NR communication standards as defined by the 3GPP technical specifications. For example, the wireless network 100 may be a E-UTRA (Evolved Universal Terrestrial Radio Access)-NR Dual Connectivity (EN-DC) network, or a NR-EUTRA Dual Connectivity (NE-DC) network. In other implementations, the wireless network 100 may be a Standalone (SA) network that incorporates only 5G NR. Furthermore, other types of communication standards are possible, including future 3GPP systems (e.g., Sixth Generation (6G)) systems, Institute of Electrical and Electronics Engineers (IEEE) 802.11 technology, or the like. While aspects may be described herein using terminology commonly associated with 5G NR, aspects of the present disclosure can be applied to other systems, such as 3G, 4G, and/or systems subsequent to 5G (e.g., 6G).

In the wireless access network 100, the UE 102 and any other UE in the system may be, for example, laptop computers, smartphones, tablet computers, machine-type devices such as smart meters or specialized devices for healthcare, intelligent transportation systems, or any other wireless devices with or without a user interface. In network 100, the base station 104 provides the UE 102 network connectivity to a broader network (not shown). This UE 102 connectivity is provided via the air interface 108 in a base station service area provided by the base station 104. In some implementations, such a broader network may be a wide area network operated by a cellular network provider, or may be the Internet. Each base station service area associated with the base station 104 is supported by antennas integrated with the base station 104. The service areas are divided into a number of sectors associated with certain antennas. Such sectors may be physically associated with fixed antennas or may be assigned to a physical area with tunable antennas or antenna settings adjustable in a beamforming process used to direct a signal to a particular sector.

The UE 102 includes control circuitry 110 coupled with transmit circuitry 112 and receive circuitry 114. The transmit circuitry 112 and receive circuitry 114 may each be coupled with one or more antennas. The control circuitry 110 may include various combinations of application-specific circuitry and baseband circuitry. The transmit circuitry 112 and receive circuitry 114 may be adapted to transmit and receive data, respectively, and may include radio frequency (RF) circuitry or front-end module (FEM) circuitry.

In various implementations, aspects of the transmit circuitry 112, receive circuitry 114, and control circuitry 110 may be integrated in various ways to implement the operations described herein. The control circuitry 110 may be adapted or configured to perform various operations such as those described elsewhere in this disclosure related to a UE.

Additionally, the transmit circuitry 112 may transmit a plurality of multiplexed uplink physical channels. The plurality of uplink physical channels may be multiplexed according to time division multiplexing (TDM) or frequency division multiplexing (FDM) along with carrier aggregation. The transmit circuitry 112 may be configured to receive block data from the control circuitry 110 for transmission across the air interface 108.

Additionally, the receive circuitry 114 may receive a plurality of multiplexed downlink physical channels from the air interface 108 and relay the physical channels to the control circuitry 110. The plurality of downlink physical channels may be multiplexed according to TDM or FDM along with carrier aggregation. The transmit circuitry 112 and the receive circuitry 114 may transmit and receive both control data and content data (e.g., messages, images, video, etc.) structured within data blocks that are carried by the physical channels.

FIG. 1 also illustrates the base station 104. In implementations, the base station 104 may be an NG radio access network (RAN) or a 5G RAN, an E-UTRAN, a non-terrestrial cell, or a legacy RAN, such as a UTRAN or GERAN. As used herein, the term "NG RAN" or the like may refer to the base station 104 that operates in an NR or 5G wireless access network 100, and the term "E-UTRAN" or the like may refer to a base station 104 that operates in an LTE or 4G wireless access network 100. The UE 102 utilizes connections (or channels) 106A, 106B, each of which includes a physical communications interface or layer.

The base station 104 circuitry may include control circuitry 116 coupled with transmit circuitry 118 and receive circuitry 120. The transmit circuitry 118 and receive circuitry 120 may each be coupled with one or more antennas that may be used to enable communications via the air interface 108. The transmit circuitry 118 and receive circuitry 120 may be adapted to transmit and receive data, respectively, to any UE connected to the base station 104. The transmit circuitry 118 may transmit downlink physical channels includes of a plurality of downlink subframes. The receive circuitry 120 may receive a plurality of uplink physical channels from various UEs, including the UE 102.

In FIG. 1, the one or more channels 106A, 106B are illustrated as an air interface to enable communicative coupling, and can be consistent with cellular communications protocols, such as a 3GPP LTE protocol, an Advanced long term evolution (LTE-A) protocol, a LTE-based access to unlicensed spectrum (LTE-U), a 5G protocol, a NR protocol, an NR-based access to unlicensed spectrum (NR-U) protocol, and/or any of the other communications protocols discussed herein. In implementations, the UE 102 may directly exchange communication data via a ProSe interface. The ProSe interface may alternatively be referred to as a sidelink (SL) interface and may include one or more logical channels, including but not limited to a Physical Sidelink Control Channel (PSCCH), a Physical Sidelink Control Channel (PSCCH), a Physical Sidelink Discovery Channel (PSDCH), and a Physical Sidelink Broadcast Channel (PSBCH). Channels 106A and 106B are example channels for the communications session between the UE requesting QoE adjustment and an end device in the network to occur.

Figure 2:
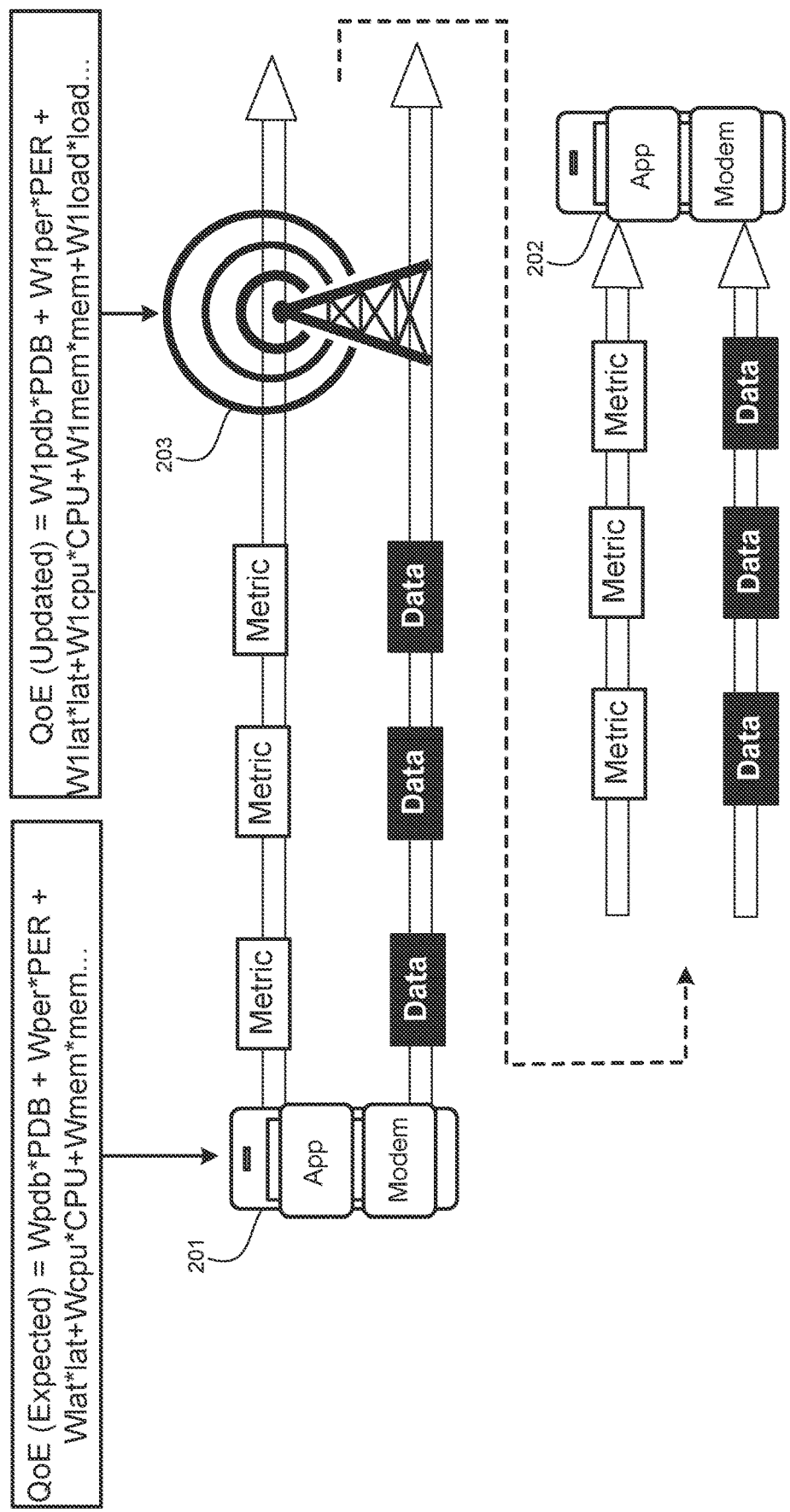
FIG. 2 illustrates an example system for managing QoE in a communications session, according to some implementations.

FIG. 2 illustrates a system 200 for managing QoE in a communications session, according to some implementations. As shown, system 200 includes UE 201, end device 202, and intermediate node 203. UE 201 executes an application (app) that exchanges data with end device 202 in a communications session over a communications channel through the intermediate node 203. Intermediate node 203 can be an access node, e.g., a base station as described previously. In some implementations, the UE 201 is similar to the UE 102, and the intermediate node is similar to the base station 104. End device 202 can be another UE, a network function, or a server, which executes one or more corresponding applications to deliver data to UE 201.

To establish communication with end device 202, UE 201 executes one or more applications configured to communicate with one or more applications or other software executed by the end device 202. Each of UE 201, end device 202, and intermediate node 203 has circuitry, such as a modem circuit, that controls the transmission and reception of wireless signals, e.g., as described with respect to FIGS. 1-4. While the figures of this application illustrate one intermediate node, some implementations can have more than one intermediate node involved in the communications session between UE 201 and end device 202.

In some implementations, UE 201 determines the current QoE of the communications session with the end device 202. Depending on the application and the network settings, the determination can be at a predetermined time or periodically and can be based on data received in the communications session from the end device 202. For example, the determination can be based on the content, format, speed, quality, or address of the data. In addition, the determination can be based on UE 201's own computation resource availability or memory usage.

In determining the current QoE of the communications session, UE 201 determines one or more parameters that affect the QoE. These parameters are also referred to as QoE metrics in this description. As an example, a UE displaying a webpage determines that the QoE is affected by one or more of the UE's CPU capacity, the UE's memory usage, the network latency, or the packet error rate (PER) of the communications session. As another example, a UE running a video or gaming application determines that the QoE is affected by, in addition to parameters in the previous example, the compression ratio of audio and video data. Each of these parameters is measured as one or more values. For example, the UE's CPU capacity may be measured by the speed of the CPU, e.g., 3 GHz, or measured by a percentage of all available computation resources, e.g., 80%. Similarly, the network latency may be measured by the time between the UE sending a signal and receiving a feedback, e.g., 100 ms. Also similarly, the UE's memory usage may be measured by the available storage space, e.g., 100 megabytes (MBs), or a percentage of all available storage space, e.g., 50%.

Different parameters can have different impacts on the QoE, depending on the communications session. For example, a UE using the communications session to conduct a computation-intensive task may find CPU capacity critical to QoE while finding audio/video quality less impactful. Likewise, a UE streaming a high-resolution video may find the network latency critical to QoE while finding memory usage less impactful. Thus, to determine a desired QoE for the present application/communications session, UE 201 assigns a weight to each parameter that affects the QoE for the communications session and calculates the QoE based on the parameter values and corresponding weights. In some implementations, the UE 202 normalizes the parameter values before calculating the QoE. The calculated QoE represents an expectation based on the current condition of the communications session, and can be referred to as estimated QoE, expected QoE, or desired QoE.

For example, as illustrated in FIG. 2, UE 201 calculates the expected QoE, QoE(Expected), based on values of five parameters: packet delay budget (PDB), PER, network latency ("lat"), CPU capacity ("CPU"), and memory usage ("mem"). UE 201 assigns a weight to each parameter: $W_{pdb}$, $W_{per}$, $W_{lat}$, $W_{cpu}$, and $W_{mem}$. Thus, UE 201 calculates the expected QoE as:

$$\text{QoE (Expected)} = W_{pdb} \times \text{PDB} + W_{per} \times \text{PER} + W_{lat} \times lat + W_{cpu} \times \text{CPU} + W_{mem} \times \text{mem} \quad \text{(on 1)}.$$

In some implementations, QoE within a certain range is desirable. This is because having too high QoE can consume too many resources (especially on the UE) and negatively affect other applications and communications sessions, and having too low QoE can negatively affect the user's experience. Thus, in some implementations, UE 201 compares the expected QoE with one or more threshold values and determines to request QoE adjustment based on whether the expected QoE satisfies the one or more thresholds.

As an example, the expected QoE satisfies the one or more thresholds if the value is either below a lower threshold value (indicating, for example, that the expected QoE does not provide adequate user experience) or higher than an upper threshold value (indicating, for example, that the expected QoE consumes too many resources). In some implementations, if the expected QoE exceeds the upper threshold, UE 201 is configured to request downgrading QoE. In some implementations, if the expected QoE is below the lower threshold, UE 201 is configured to request upgrading QoE.

As another example, the expected QoE satisfies the one or more thresholds if the value of the expected QoE is either lower than an upper threshold (indicating, for example, that the expected QoE does not consume too many resources) or is above a lower threshold (indicating, for example, that the expected QoE provides adequate user experience). In some implementations, if the expected QoE is lower than the upper threshold, UE 201 is configured to request upgrading QoE. In some implementations, if the expected QoE is above the lower threshold, UE 201 is configured to request downgrading QoE.

Furthermore, AI techniques, such as machine learning, are used in some implementations to facilitate the decision-making of requesting QoE changes. For example, UE 201 can execute a machine learning algorithm to decide when to request QoE changes. The machine learning algorithm can be configured to dynamically change the upper or lower thresholds, or can be configured to weigh in multiple factors besides the thresholds. With the flexibility afforded by AI techniques, the implementations can react quickly to complex network environment, allowing the QoE requests to be transmitted and processed with little delay.

Keeping with FIG. 2, to request a QoE adjustment, UE 201 transmits one or more QoE metrics to the network. The transmission of QoE metrics is via intermediate node 203 and is ultimately directed to end device 202. In the flow of QoE metrics, UE 201 transmits the parameters that affect QoE along with the determined weights corresponding to each parameter. In some implementations, the QoE metrics are transmitted as a flow of sequential transmissions. For example, in some cases, the UE 201 first transmits a parameter PDB along with $W_{pdb}$, and then a second transmission of PER along with $W_{per}$, followed by another transmission of network latency along with $W_{lat}$, and so forth. In some implementations, all the QoE metrics are transmitted in a single transmission.

The QoE metrics can be transmitted in a variety of formats. Example formats include: Extensible Markup Language (XML), JavaScript Object Notation (JSON), a binary format, and a Representational State Transfer (REST) format. The QoE metrics can also be transmitted in other formats. In some implementations, the QoE metrics can be transmitted in a secured connection established between UE 201 and the intermediate node 203. These named formats are non-limiting examples. In practice, the format can be chosen depending on various factors, such as the desired levels of simplicity and security for the QoE metrics to be received and comprehended by the intermediate nodes.

In some implementations, the flow of QoE metrics is transmitted along with a flow of application data ("app data") in the frequency band of the communications session.

In some other implementations, the flow of QoE metrics is transmitted separately from the application data, e.g., using a separate control channel.

Intermediate node 203 receives the flow of QoE metrics from UE 201 and processes the QoE metrics in the order they are received. In some implementations, intermediate node 203 determines, based on conditions at the intermediate node, one or more new parameters and corresponding weights that affect the QoE of intermediate node 203. Examples of the conditions include: capacity of the intermediate node, network congestion and load, priority of the communications sessions, interference with other networks, and restrictions imposed by network carriers or regulatory agencies.

Intermediate node 203 then adds the new parameters and corresponding weights as additional components of the QoE metrics flow. Using the existing and new parameters and weights, intermediate node 203 determines updated QoE metrics including those determined by UE 201 and those determined by intermediate node 203. In the example of FIG. 2, intermediate node 203 adds a parameter that describes network load ("load) and assigns a weight $W_{load}$ to network load. Combining the new parameter with the five parameters received from UE 201, intermediate node 203 calculates updated weights corresponding to all six parameters: $W1_{pdb}$ corresponding to PDB; $W1_{per}$ corresponding to PER; $W1_{lat}$ corresponding to network latency; $W1_{cpu}$ corresponding to CPU capacity; $W_{mem}$ corresponding to memory usage; and $W1_{load}$ corresponding to the network load. The first five QoE parameters are determined by UE 201 while the sixth QoE parameter is determined by intermediate node 203. The updated QoE parameter values describe the QoE adjustment requested by UE 201 and modified by intermediate node 203.

Intermediate node 203 then forwards the updated QoE metrics to end device 202. In implementations where there are multiple intermediate nodes 203, one or more of the additional intermediate nodes 203 can also update the QoE parameters as described above, and these QoE parameters are forwarded to the next intermediate node 203 in the network until the flow of updated QoE metrics reaches end device 202. Thus, the QoE parameters that ultimately reach end device 202 represent UE 201's QoE adjustment request modified by each intermediate node 203 along the communication path.

When end device 202 receives the updated QoE metrics, end device 202 calculates an updated QoE, QoE(Updated), using the values of the parameters and the corresponding weights. In the example of FIG. 2, assuming the only new parameter added by intermediate node 203 is network load, the updated QoE can be calculated as:

$$\text{QoE (Updated)} = W1_{pdb} \times \text{PDB} + W1_{per} \times \text{PER} + W1_{lat} \times \text{lat} + W1_{cpu} \times \text{CPU} + W1_{mem} \times \text{mem} + W1_{load} \times \text{load} \quad \text{(Equation 2)}.$$

By calculating the updated QoE and by comparing the updated QoE metrics with the current condition, end device 202 infers what adjustment UE 201 is requesting and what actual adjustment the network can support. End device 202 then adjusts the communications session accordingly such that the QoE adjustment is reflected in subsequently data transmission with UE 201 in the communications session. The adjustment of the communications session can include changes made by the application, such as changing the content or format of audio/video signals, and can include changes made by the modem, such as changing the power or encryption of the wireless signals.

For example, if end device 202 determines from the updated QoE metrics that CPU usage has a very high weight and network latency has a very low weight, end device 202 knows that UE 201's QoE is very sensitive to the amount of CPU computation and not very sensitive to the network latency. End device 202 thus infers that UE 201 requests reducing computation intensity while not worrying about longer delay of data transmission. As a result, end device 202 can adjust the communications session to transmit, at a lower speed, data that use less CPU resources (e.g., data with less compression ratio). With this adjustment, UE 201 can see an improvement to QoE.

In some implementations, UE 201 wants further adjustment after the QoE metrics are updated. In such situations, UE 201 repeats the procedure described above by sending another flow of QoE metrics to intermediate node 203 and ultimately to end device 202. In response, intermediate node 203 and end device 202 process the renewed QoE adjustment request and if possible, make further adjustment to the communications session. The procedure of request-update-adjust can continue in multiple iterations until all participants in the communications session settle at an agreed-upon state.

The example system described with reference to FIG. 2 provides a feedback mechanism for a UE in communication with an end device to dynamically adjust a communications session in response to a QoE adjustment request. The adjustment considers the demand of multiple participants of the communications session (UE, intermediate node, and end device) and reflects a compromise among the participants. The adjustment can be done during the communications session with little interruption. In this manner, the example system advantageously improves the efficiency of QoE adjustment and reliability of the communications session. Additionally, the example system only incurs only a minimal amount of extra data exchange in the communications session. There is no need to introduce additional control information to particularly account for the extra exchange. Thus, the example system does not require complex changes to existing communications protocols.

Figure 3:
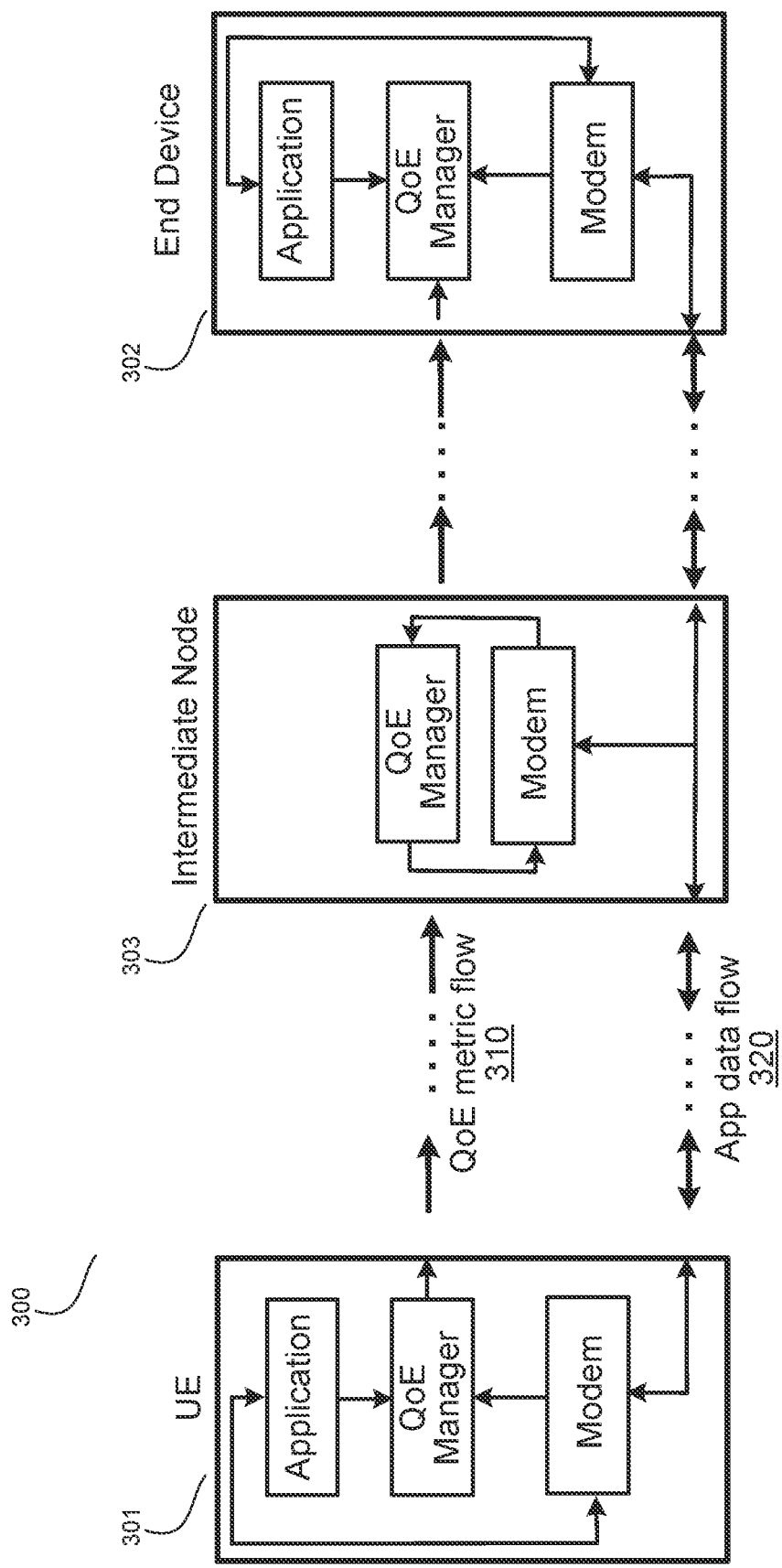
FIG. 3 illustrates block diagrams of a UE, an intermediate node, and an end device that manage QoE in a communications session, according to some implementations.

FIG. 3 illustrates block diagrams 300 of a UE 301, an intermediate node 303, and an end device 302 that manage QoE in a communications session, according to some implementations. Similar to the system illustrated in FIG. 2, UE 301 and end device 302 exchange application data ("app data") flow 320 in the communications session involving intermediate node 303. UE 301 also transmits QoE metric flow 310 to intermediate node 303 and ultimately to end device 302. In some implementations, UE 301 is similar to the UE 201, intermediate node 303 is similar to intermediate node 203, and end device 302 is similar to end device 202.

Each of UE 310 and end device 302 executes an application that communicate with each other in the communications session. The application can be, e.g., software code that controls the service and data delivered or received.

Each of UE 310, intermediate node 303, and end device 302 has a modem that controls the transmission and reception of wireless signals. Each of UE 310, intermediate node 303, and end device 302 also has a QoE manager that interacts with the modem and/or the application to manage the determination, request, and adjustment of QoE. The QoE managers of UE 310, intermediate node 303, and end device 302 can be implemented on hardware circuit, such as circuit of a processor. Operations of the QoE managers of UE 310, intermediate node 303, and end device 302 are described below in detail with reference to FIGS. 4-6.

Figure 4:
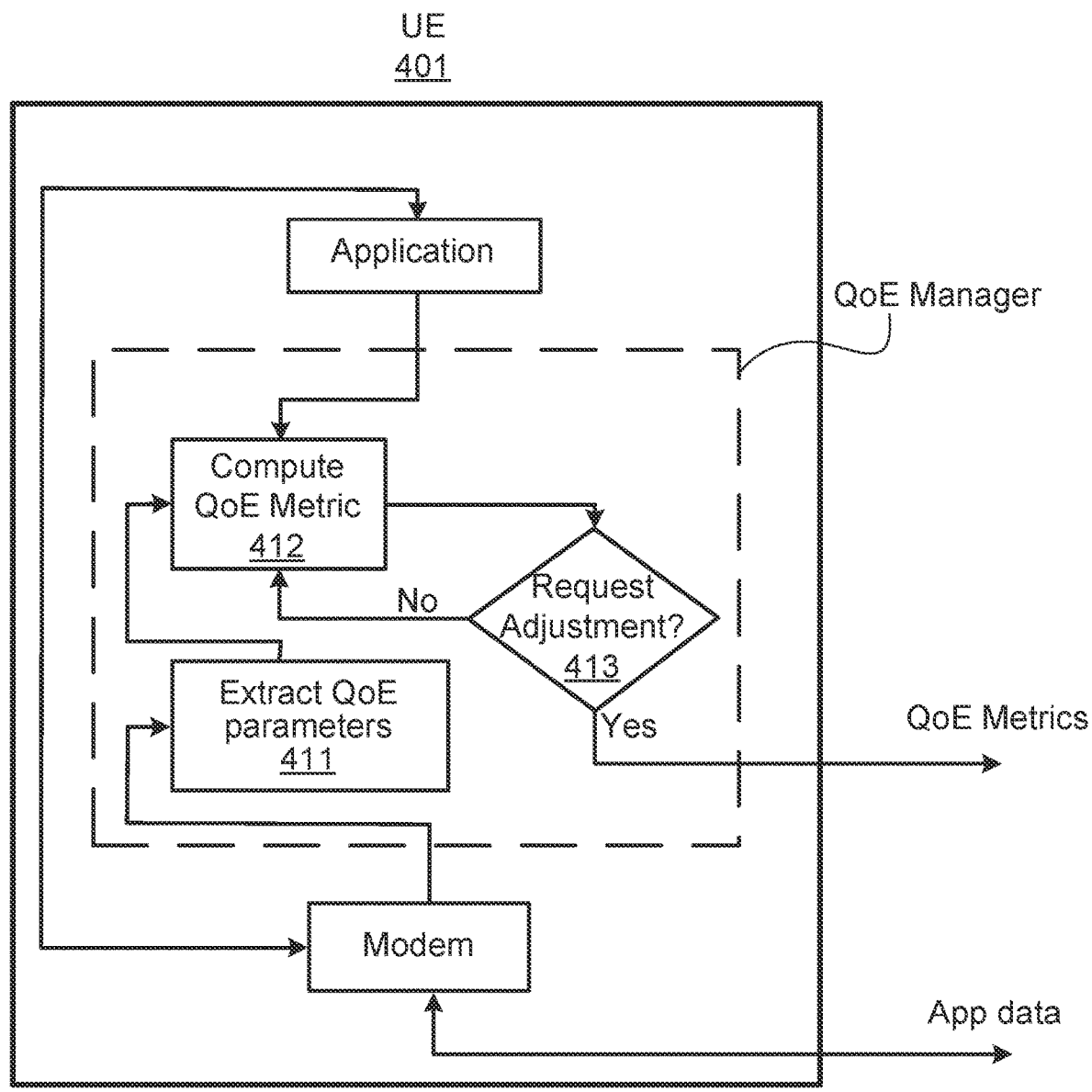
FIG. 4 illustrates operations of a QoE manager component of a UE, according to some implementations.

FIG. 4 illustrates operations of a QoE manager component of a UE 401, according to some implementations. In some implementations, UE 401 is similar to UE 301. Consistent with the illustration in FIG. 3, UE 401 runs an application that transmits and receives app data wirelessly via a modem. The QoE manager interacts with the application and the modem to execute operations 411-413.

Specifically, at 411, the QoE manager extracts QoE parameters from the app data received by the modem. For example, the extracted QoE parameters indicate PDB, PER, and network latency in the communications session at the current condition. These extracted parameters are used for computing QoE metrics at 412.

At 412, the QoE manager calculates an expected QoE. The calculation takes into account not only the extracted parameters from the app data but also the demand of the application, such as the user's subscription level to a video streaming provider, the difficulty level of a chess game, or the battery level of the device, etc. Combining the parameters from the app data and from the application, the QoE manager determines the parameters and their corresponding weights.

At 413, the QoE manager determines whether an adjustment request is needed. As described previously with reference to FIG. 2, the determination can be based on comparing the expected QoE with one or more QoE thresholds. If the QoE manager determines to not request QoE adjustment, then the QoE manager waits a while and repeats 412. Otherwise, the QoE manager requests QoE adjustment by sending the QoE metrics to the network.

Figure 5:
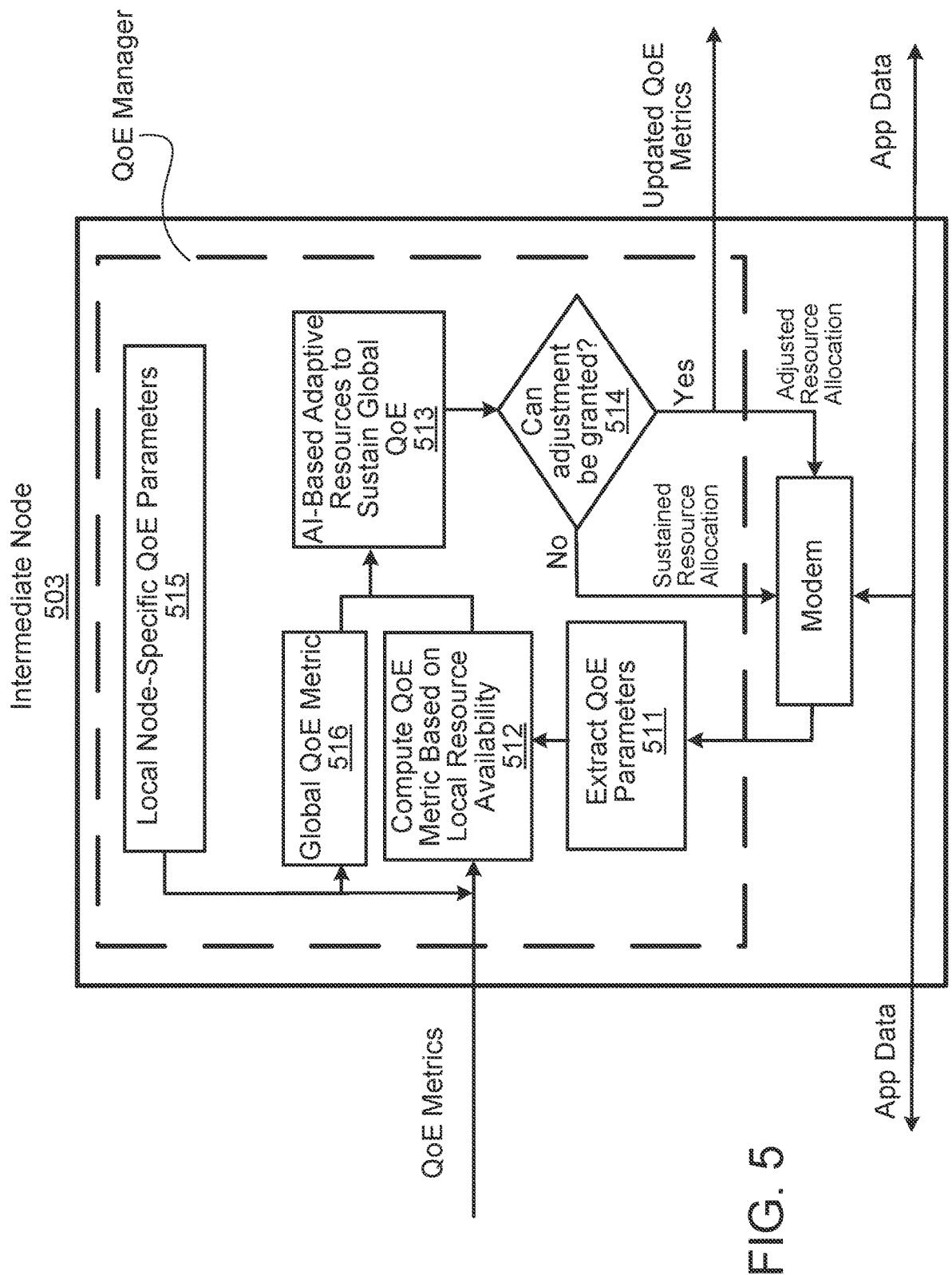
FIG. 5 illustrates operations of a QoE manager component of an intermediate node, according to some implementations.

FIG. 5 illustrates operations of a QoE manager component of an intermediate node 503, according to some implementations. In some implementations, intermediate node 503 is similar to intermediate node 303. Similar to the QoE manager of UE 401, the QoE manager of intermediate node 503 extracts QoE parameters from app data at 511. The extracted parameters are used for computing updated QoE metrics at 512.

At 512, the QoE manager computes the updated QoE metrics. The computation takes into account not only the extracted parameters from app data, but also local QoE parameters 515 of intermediate node 503. For example, even if the UE assigns a high weight to network latency to request an increase in network speed, intermediate node 503 may reduce the assigned weight because of the capability of intermediate node 503.

In some implementations, intermediate node 503 is an access node that is also involved in other communications sessions in the network. Accordingly, the update of QoE metrics cannot violate global QoE metrics 516. Global QoE metrics 516 include, e.g., interference level, global network capacity, and other metrics imposed by regulatory agencies or commercial organizations. The global QoE metrics 516 and the computed updated QoE metrics are together processed at 513.

At 513, the QoE manager determines the resources that are needed to sustain the global metrics 516 after updating the QoE metrics for the UE. In some implementations, the resources are adaptively determined at 513 uses artificial intelligence (AI)-based techniques such as machine learning.

At 514, the QoE manager determines whether updating the QoE metrics for the UE can sustain the global metrics 516. If the answer is Yes, then the QoE manager outputs the updated QoE metrics to the next intermediate node or to the end device while adjusting the network resource allocation to sustain the global metrics. If the answer is No, it means the updated QoE metrics will violate the global metrics 516 and should not be granted. In this case, the QoE manager keeps the current network resource allocation unadjusted without outputting the updated QoE metrics. The QoE manager can either decline the UE's QoE adjustment request or redo 511-516 to update the QoE metrics differently.

Figure 6:
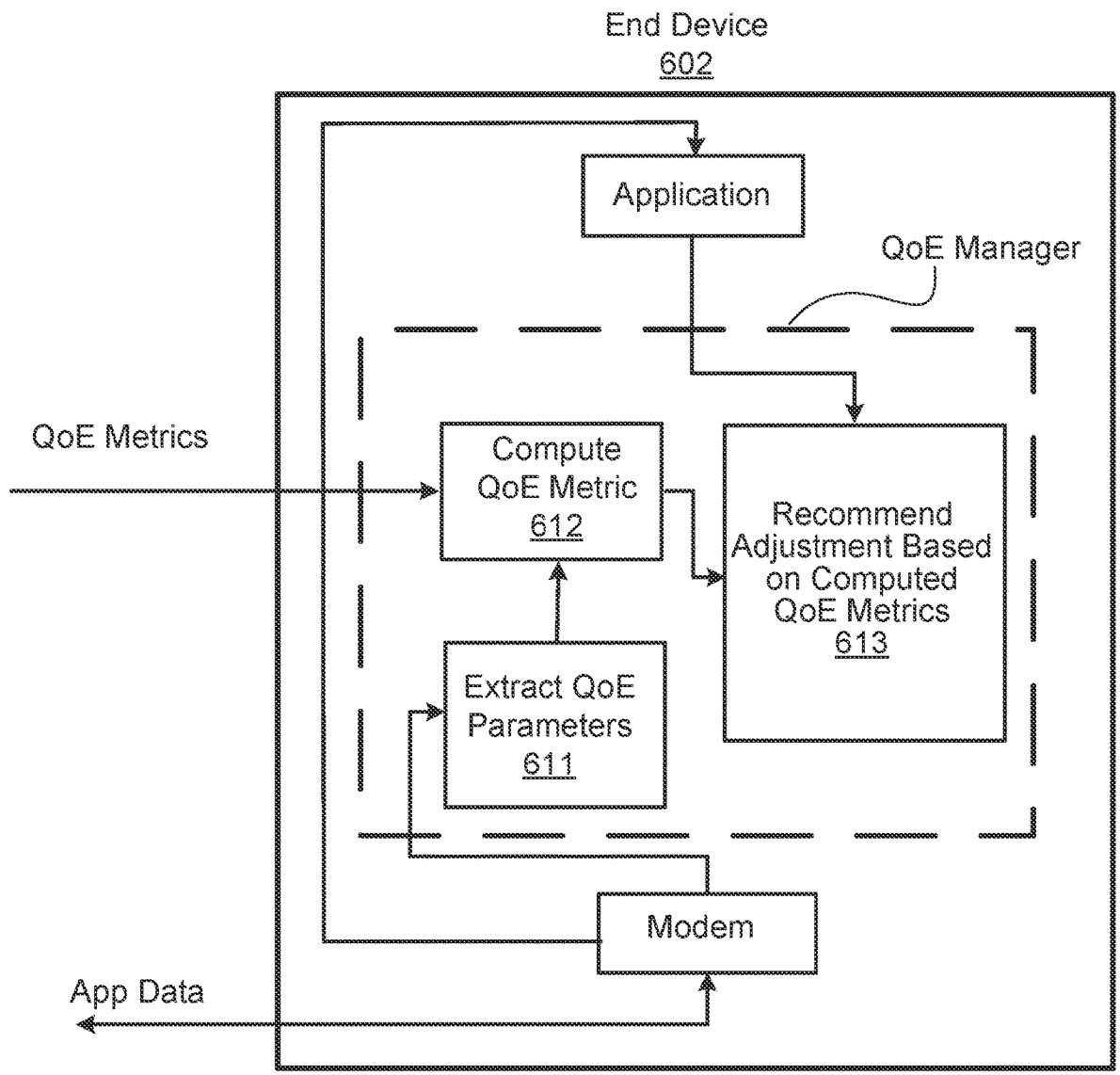
FIG. 6 illustrates operations of a QoE manager component of an end device, according to some implementations.

FIG. 6 illustrates operations of a QoE manager component of an end device 602, according to some implementations. In some implementations, end device 602 is similar to end device 302. Similar to the QoE manager of UE 401, the QoE manager of end device 602 extracts QoE parameters from app data at 611. The extracted parameters are used for computing QoE metrics specific to end device 602 at 612.

At 612, the QoE manager computes QoE metrics based on the QoE metrics received from the intermediate node(s) and the extracted parameters. The computation result reflects the QoE adjustment request of the UE, the QoE metrics at each intermediate node, and the QoE metrics of end device 602 itself. Balancing the needs of all participants of the communications session, the QoE manager recommends adjustment to the communications session at 613. End device 602 then adjusts the communications session and transmits app data according to the recommendation. The adjustment of the communications session can lead to an adjustment of QoE at the requesting UE.

Figure 7:
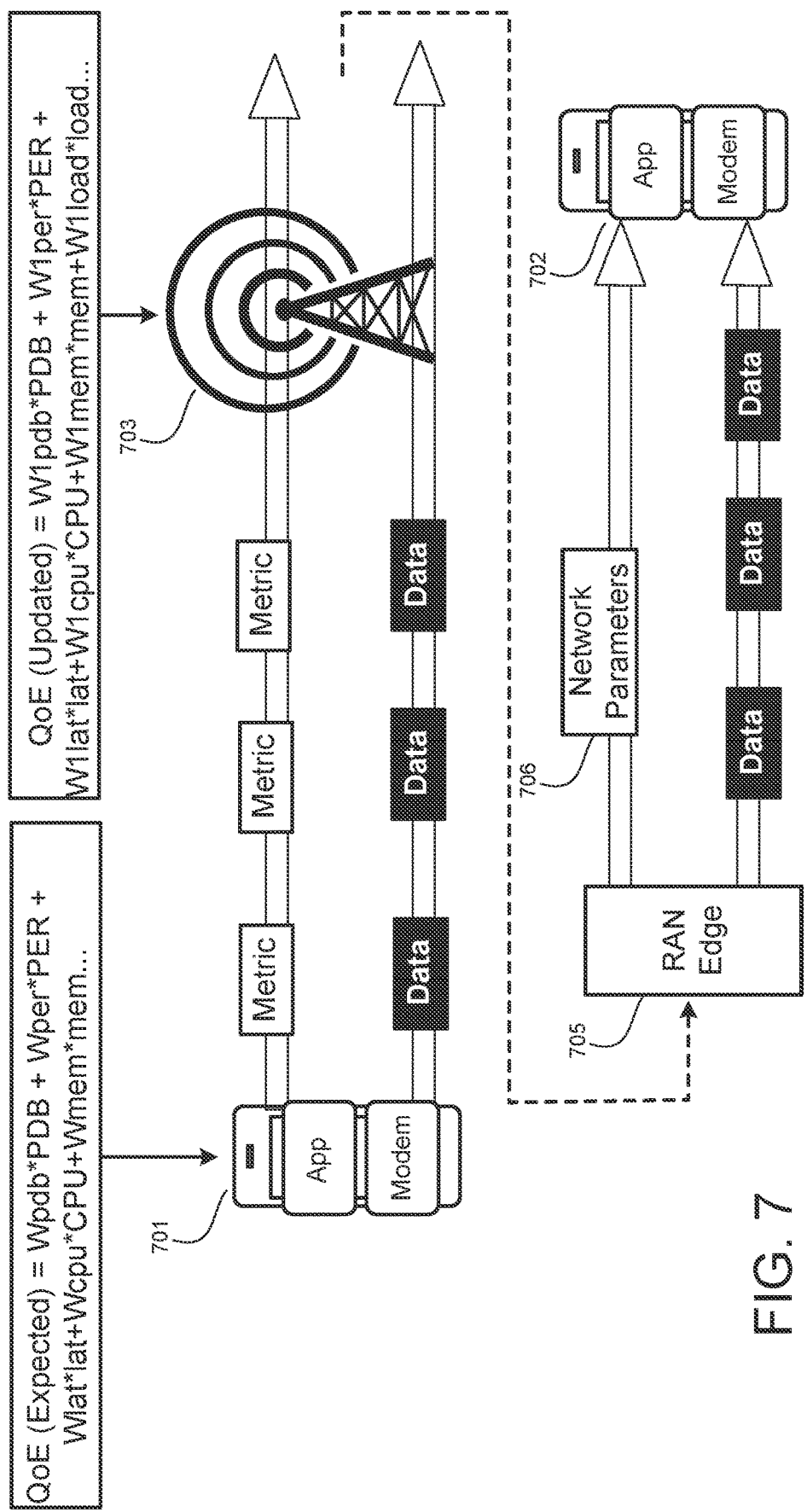
FIG. 7 illustrates an example system for managing QoE in a communications session, according to some implementations.

FIG. 7 illustrates another example system 700 for managing QoE in a communications session, according to some implementations. Similar to system 200 of FIG. 2, system 700 involves UE 701 requesting QoE adjustment by transmitting QoE metrics to intermediate node 703 and ultimately to end device 702. However, different from system 200, system 700 additionally involves radio access network (RAN) edge node 705 that converts the updated metrics into network parameters 706 and transmits network parameters 706 to end device 702. In other words, instead of having intermediate node 703 directly transmitting the QoE metric flow to end device 702, RAN edge node 705 first converts the QoE metric flow to network parameters 706 and then transmits the network parameters 706 to end device 702. Upon receiving network parameters 706, end device 702 converts network parameters 706 back to QoE metrics and adjusts the communications session similarly to the adjustment in system 200.

Network parameters 706 can be formatted according to various protocols, such as Network Exposure Functions (NEF) or Service Capability Exposure Functions (SCEF). With the conversion, end device 702 does not need to be implemented to account for all possible formats of QoE flow in the network. Specifically, if end device 702 communicates with multiple UEs in multiple communications sessions, and if the multiple UEs transmit QoE metric flows in multiple formats, end device 702 does not need to be able to understand each format of the QoE flow but only needs to understand the format of network parameters 706. With RAN edge node 705 converting all QoE flow formats to a standardized format, end device 702 can support QoE adjustment with UEs of different types (e.g., from different vendors) without significantly increasing complexity.

Figure 8:
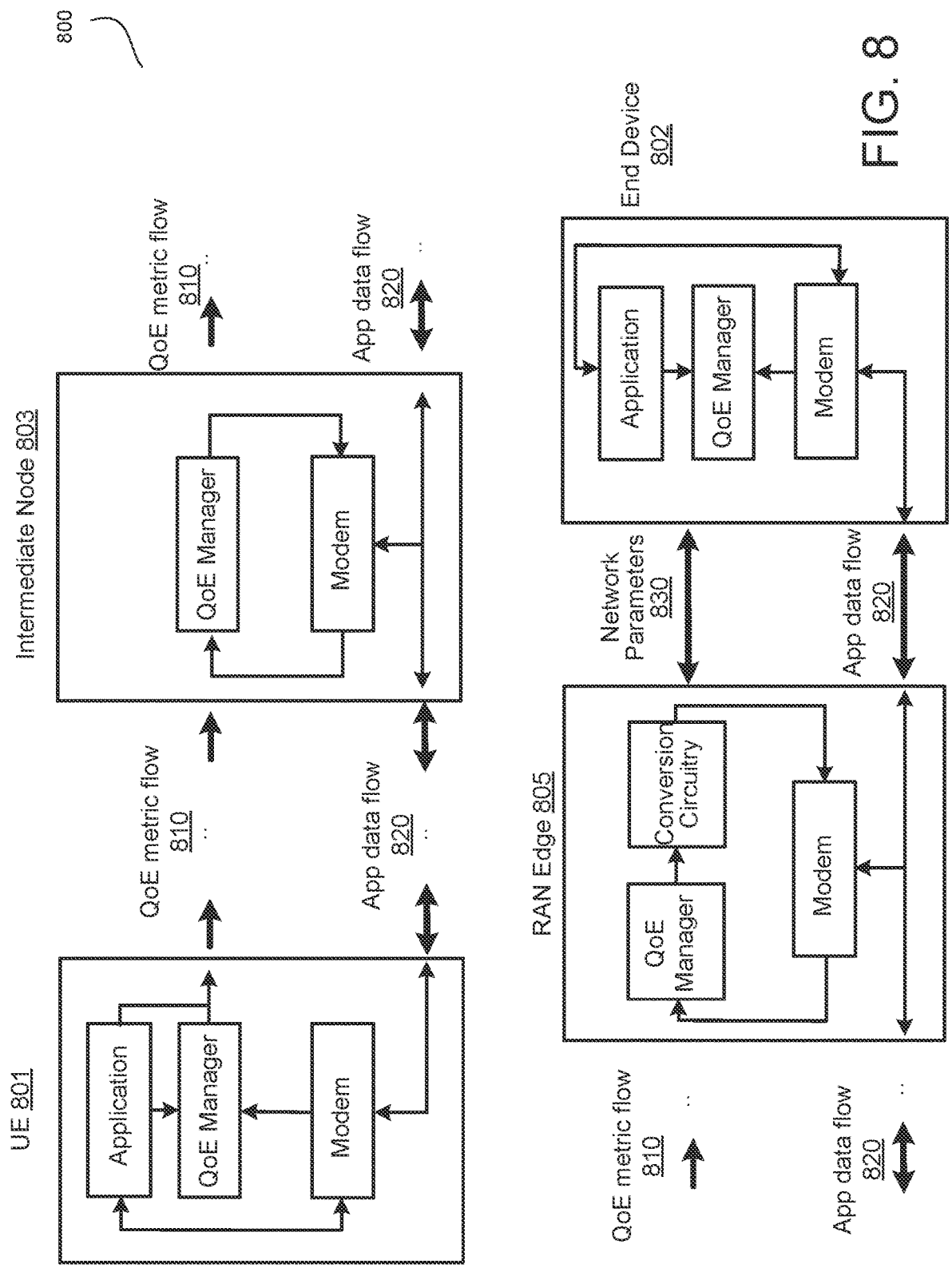
FIG. 8 illustrates block diagrams of a UE, an intermediate node, an RAN edge node, and an end device that manage QoE in a communications session, according to some implementations.

FIG. 8 illustrates block diagrams 800 of a UE 801, an intermediate node 803, an RAN edge node 805, and an end device 802 that together manage QoE in a communications session, according to some implementations. The structure of UE 801, intermediate node 803, and end device 802 are substantially the same as those described in block diagrams 300 of FIG. 3. This description thus omits these components for brevity while focusing on describing RAN edge node 805. In addition, UE 801, intermediate node 803, RAN edge node 805, and end device 802 can be substantially the same as UE 701, intermediate node 703, RAN edge node 705, and end device 702 in system 700 of FIG. 7.

In a wireless network, an RAN edge node typically refers a node that sits outside of the core network and close to the end user on a communication path. A wireless network can delegate some tasks to the RAN edge node to improve efficiency and reduce latency. In FIG. 8, RAN edge node 805 has a QoE manager that receives QoE metric flow 810 and a modem that transmits and receives app data flow 820. Accordingly, in RAN edge node 805 can be regarded as an intermediate node that is closest to end device 802.

RAN edge node 805 includes conversion circuitry that converts the QoE metrics to network parameters. In some implementations, the conversion circuitry is implemented as an NEF/SCEF interface that outputs NEF/SCEF formatted signals. The conversion circuitry can be implemented as part of the QoE manager circuitry or separately from the QoE manager circuitry.

Figure 9:
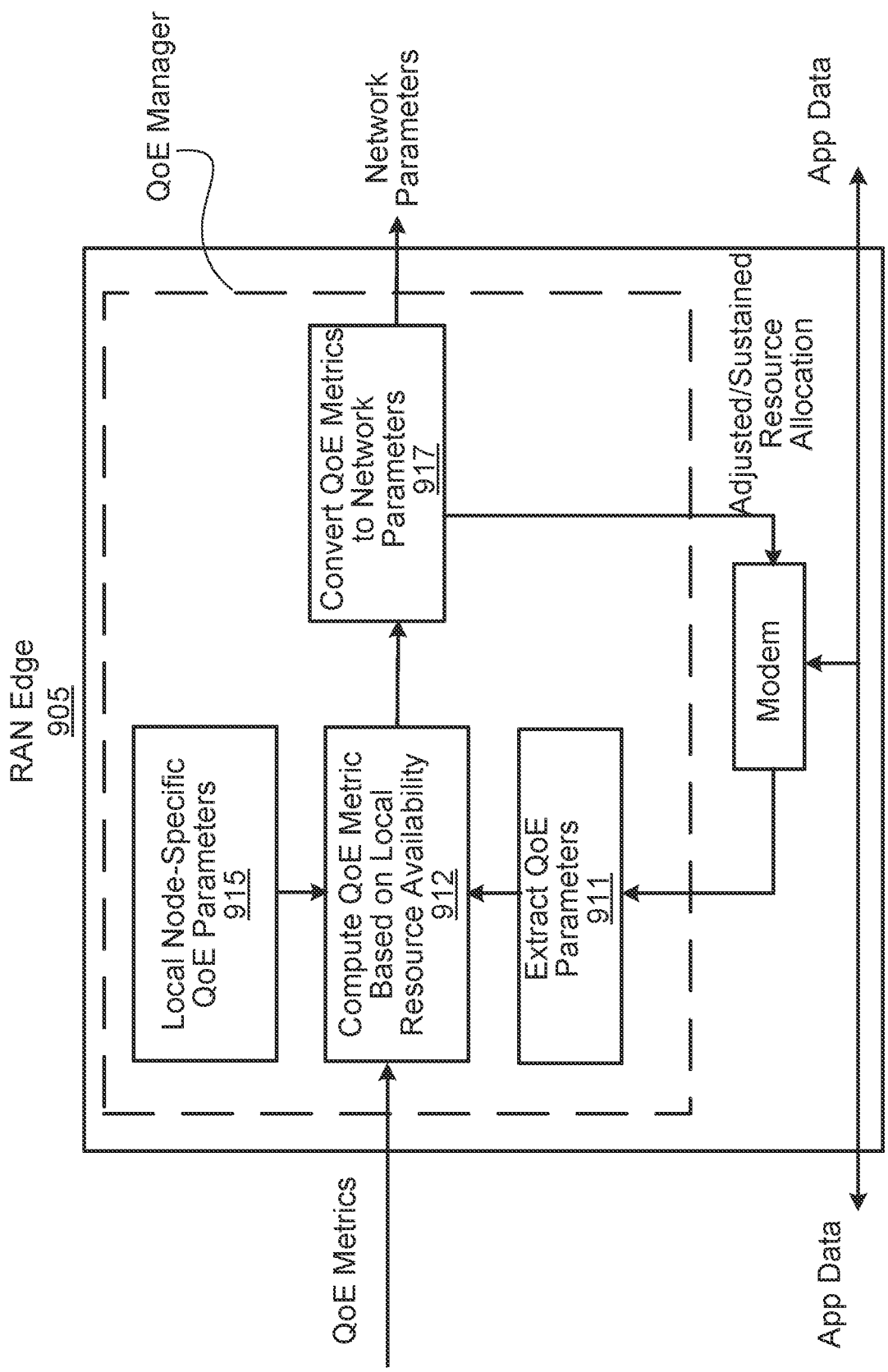
FIG. 9 illustrates operations of a QoE manager component of an RAN edge node, according to some implementations.

FIG. 9 illustrates operations of a QoE manager component of an example RAN edge node 905, according to some implementations. In this example RAN edge node 905 implements the conversion circuitry as part of the QoE manager circuitry. In some implementations, the RAN edge node 905 is similar to RAN edge node 705 or 805.

In FIG. 9, operations such as 911, 912, and 915 are substantially the same as corresponding operations 511, 512, and 515 described in FIG. 5. Different from intermediate node 503 in FIG. 5, RAN edge node 905 coverts QoE metrics to network parameters at 917 before outputting the network parameters to the end device. As described with reference to FIGS. 7 and 8, the network parameters can be formatted according to various standardized protocols such as NEF and SCEF.

Figure 10A:
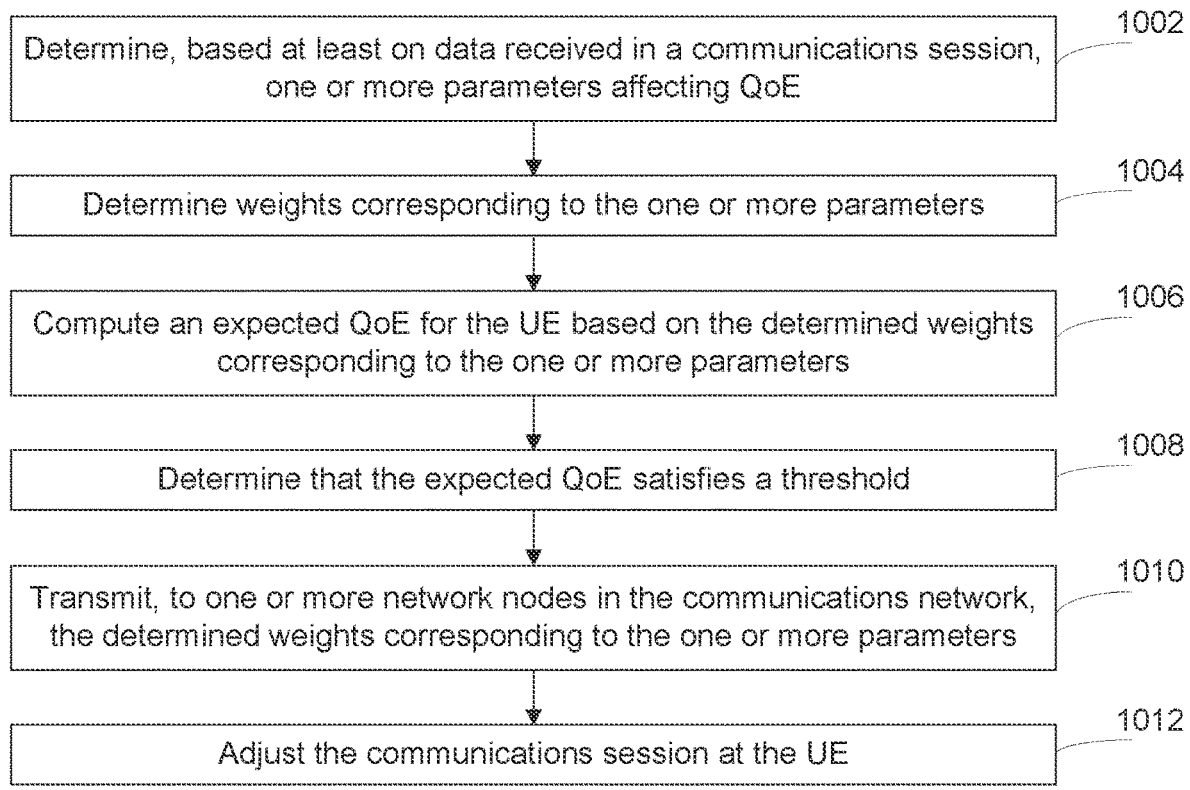
FIG. 10A illustrates a flowchart of an example method for managing QoE, according to some implementations.

FIG. 10A illustrates a flowchart of an example method 1000A, according to some implementations. For clarity of presentation, the description that follows generally describes method 1000A in the context of the other figures in this description. For example, method 1000A can be performed by UE 201 of FIG. 2 or UE 701 of FIG. 7. It will be understood that method 1000A can be performed, for example, by any suitable system, environment, software, hardware, or a combination of systems, environments, software, and hardware, as appropriate. In some implementations, various steps of method 1000A can be run in parallel, in combination, in loops, or in any order.

At 1002, method 1000A involves determining, based at least on data received in a communications session, one or more parameters affecting the QoE. The determination at 1002 can be, e.g., similar to operation 411 of FIG. 4, and the parameters can likewise include PDB, PER, and network latency.

At 1004, method 1000A involves determining weights corresponding to the one or more parameters. The determination at 1004 can be, e.g., part of operation 412 of FIG. 4.

At 1006, method 1000A involves computing an expected QoE for the UE based on the determined weights corresponding to the one or more parameters. The computation at 1006 can be, e.g., part of operation 412 of FIG. 4, and can be similar to the calculation of equation 1 in FIG. 2.

At 1008, method 1000A involves determining that the expected QoE satisfies a threshold. The determination at 1008 can be similar to operation 413 of FIG. 4.

At 1010, method 1000A involves transmitting, to one or more network nodes in the communications network, the determined weights corresponding to the one or more parameters. The transmission can be, e.g., similar to the transmission of the QoE metrics flow shown in FIG. 2-5.

At 1012, method 1000A involves adjusting the communications session at the UE. The adjustment can be based on the data received from an end device and can be based on the updated QoE parameters determined by one or more intermediate nodes.

Figure 10B:
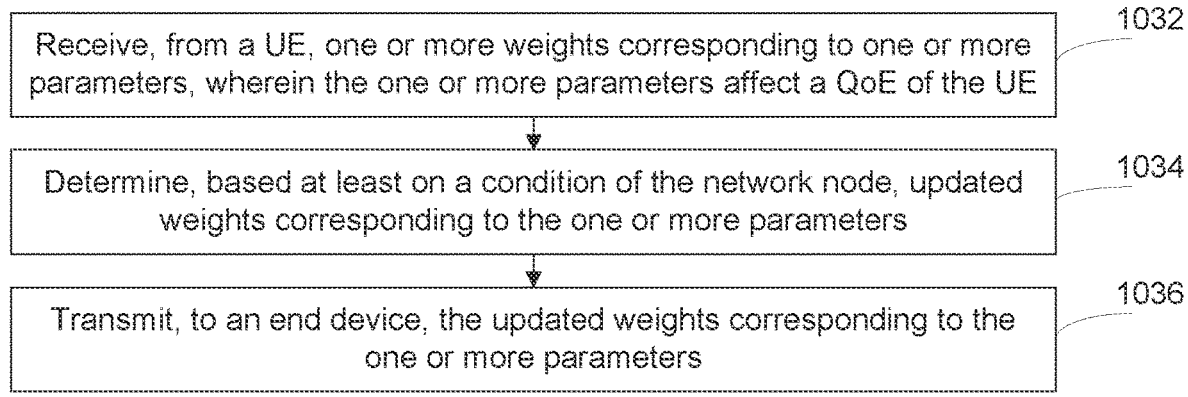
FIG. 10B illustrates a flowchart of an example method for managing QoE, according to some implementations.

FIG. 10B illustrates a flowchart of an example method 1000B for managing QoE, according to some implementations. For clarity of presentation, the description that follows generally describes method 1000B in the context of the other figures in this description. For example, method 1000B can be performed by intermediate node 203 of FIG. 2 or intermediate node 703 of FIG. 7. It will be understood that method 1000B can be performed, for example, by any suitable system, environment, software, hardware, or a combination of systems, environments, software, and hardware, as appropriate. In some implementations, various steps of method 1000B can be run in parallel, in combination, in loops, or in any order.

At 1032, method 1000B involves receiving, from a UE, one or more weights corresponding to one or more parameters, wherein the one or more parameters affect a QoE of the UE. The reception of weights at 1032 can be, e.g., similar to the reception of QoE metric flow illustrated in FIGS. 2-5 or 7-9.

At 1034, method 1000B involves determining, based at least on a condition of the network node, updated weights corresponding to the one or more parameters. The determination can be, e.g., similar to one or more of operations 511-516 of FIG. 5.

At 1036, method 1000B involves transmitting, to an end device, the updated weights corresponding to the one or more parameters. The transmission can be, e.g., similar to the transmission of the updated QoE metric flow in FIG. 5, 6, 8, or 9.

Figure 11:
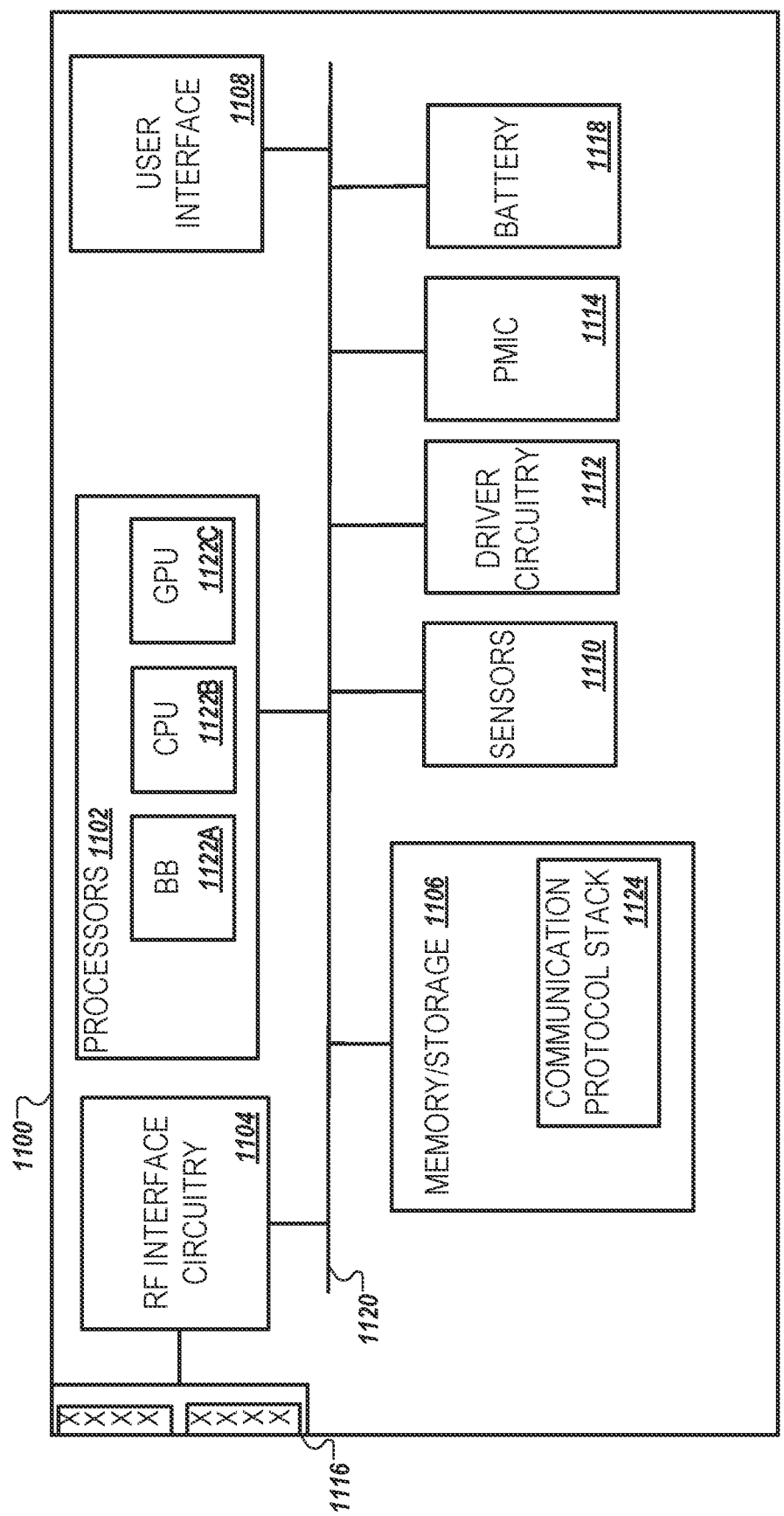
FIG. 11 illustrates an example of a UE, according to some implementations.

FIG. 11 illustrates a UE 1100, according to some implementations. The UE 1100 may be similar to and substantially interchangeable with UE 102 of FIG. 1, UE 201 of FIG. 2, or UE 701 of FIG. 7.

The UE 1100 may be any mobile or non-mobile computing device, such as, for example, mobile phones, computers, tablets, industrial wireless sensors (for example, microphones, pressure sensors, thermometers, motion sensors, accelerometers, inventory sensors, electric voltage/current meters, etc.), video devices (for example, cameras, video cameras, etc.), wearable devices (for example, a smart watch), relaxed-IoT devices.

The UE 1100 may include processors 1102, RF interface circuitry 1104, memory/storage 1106, user interface 1108, sensors 1110, driver circuitry 1112, power management integrated circuit (PMIC) 1114, one or more antennas 1116, and battery 1118. The components of the UE 1100 may be implemented as integrated circuits (ICs), portions thereof, discrete electronic devices, or other modules, logic, hardware, software, firmware, or a combination thereof. The block diagram of FIG. 11 is intended to show a high-level view of some of the components of the UE 1100. However, some of the components shown may be omitted, additional components may be present, and different arrangement of the components shown may occur in other implementations.

The components of the UE 1100 may be coupled with various other components over one or more interconnects 1120, which may represent any type of interface, input/output, bus (local, system, or expansion), transmission line, trace, optical connection, etc. that allows various circuit components (on common or different chips or chipsets) to interact with one another.

The processors 1102 may include processor circuitry such as, for example, baseband processor circuitry (BB) 1122A, central processor unit circuitry (CPU) 1122B, and graphics processor unit circuitry (GPU) 1122C. The processors 1102 may include any type of circuitry or processor circuitry that executes or otherwise operates computer-executable instructions, such as program code, software modules, or functional processes from memory/storage 1106 to cause the UE 1100 to perform operations as described herein. For example, the processors 1102 may be configured to execute an application that controls a communications session with an end device, and may be configured to manage the QoE of the UE 1100 in accordance with the description with reference to FIGS. 2-4, 7, and 8.

In some implementations, the baseband processor circuitry 1122A may access a communication protocol stack 1124 in the memory/storage 1106 to communicate over a 3GPP compatible network. In general, the baseband processor circuitry 1122A may access the communication protocol stack to: perform user plane functions at a physical (PHY) layer, medium access control (MAC) layer, radio link control (RLC) layer, packet data convergence protocol (PDCP) layer, service data adaptation protocol (SDAP) layer, and PDU layer; and perform control plane functions at a PHY layer, MAC layer, RLC layer, PDCP layer, RRC layer, and a non-access stratum layer. In some implementations, the PHY layer operations may additionally/alternatively be performed by the components of the RF interface circuitry 1104. The baseband processor circuitry 1122A may generate or process baseband signals or waveforms that carry information in 3GPP-compatible networks. In some implementations, the waveforms for NR may be based cyclic prefix orthogonal frequency division multiplexing (OFDM) "CP-OFDM" in the uplink or downlink, and discrete Fourier transform spread OFDM "DFT-S-OFDM" in the uplink.

The memory/storage 1106 may include one or more non-transitory, computer-readable media that includes instructions (for example, communication protocol stack 1124) that may be executed by one or more of the processors 1102 to cause the UE 1100 to perform various operations described herein. The memory/storage 1106 include any type of volatile or non-volatile memory that may be distributed throughout the UE 1100. In some implementations, some of the memory/storage 1106 may be located on the processors 1102 themselves (for example, L1 and L2 cache), while other memory/storage 1106 is external to the processors 1102 but accessible thereto via a memory interface. The memory/storage 1106 may include any suitable volatile or non-volatile memory such as, but not limited to, dynamic random access memory (DRAM), static random access memory (SRAM), erasable programmable read only memory (EPROM), electrically erasable programmable read only memory (EEPROM), Flash memory, solid-state memory, or any other type of memory device technology.

The RF interface circuitry 1104 may include transceiver circuitry and radio frequency front module (RFEM) that allows the UE 1100 to communicate with other devices over a radio access network. The RF interface circuitry 1104 may include various elements arranged in transmit or receive paths. These elements may include, for example, switches, mixers, amplifiers, filters, synthesizer circuitry, control circuitry, etc. The RF interface circuitry 1104 may include modem circuitry as described with reference to FIGS. 3, 4, and 8. The RF interface circuitry 1104 may be configured to transmit and receive app data and QoE metrics.

In the receive path, the RFEM may receive a radiated signal from an air interface via one or more antennas 1116 and proceed to filter and amplify (with a low-noise amplifier) the signal. The signal may be provided to a receiver of the transceiver that downconverts the RF signal into a baseband signal that is provided to the baseband processor of the processors 1102.

In the transmit path, the transmitter of the transceiver up-converts the baseband signal received from the baseband processor and provides the RF signal to the RFEM. The RFEM may amplify the RF signal through a power amplifier prior to the signal being radiated across the air interface via the antenna 1116. In various implementations, the RF interface circuitry 1104 may be configured to transmit/receive signals in a manner compatible with NR access technologies.

The antenna 1116 may include antenna elements to convert electrical signals into radio waves to travel through the air and to convert received radio waves into electrical signals. The antenna elements may be arranged into one or more antenna panels. The antenna 1116 may have antenna panels that are omnidirectional, directional, or a combination thereof to enable beamforming and multiple input, multiple output communications. The antenna 1116 may include microstrip antennas, printed antennas fabricated on the surface of one or more printed circuit boards, patch antennas, phased array antennas, etc. The antenna 1116 may have one or more panels designed for specific frequency bands including bands in FR1 or FR2.

The user interface 1108 includes various input/output (I/O) devices designed to enable user interaction with the UE 1100. The user interface 1108 includes input device circuitry and output device circuitry. Input device circuitry includes any physical or virtual means for accepting an input including, inter alia, one or more physical or virtual buttons (for example, a reset button), a physical keyboard, keypad, mouse, touchpad, touchscreen, microphones, scanner, headset, or the like. The output device circuitry includes any physical or virtual means for showing information or otherwise conveying information, such as sensor readings, actuator position(s), or other like information. Output device circuitry may include any number or combinations of audio or visual display, including, inter alia, one or more simple visual outputs/indicators (for example, binary status indicators such as light emitting diodes "LEDs" and multi-character visual outputs), or more complex outputs such as display devices or touchscreens (for example, liquid crystal displays "LCDs," LED displays, quantum dot displays, projectors, etc.), with the output of characters, graphics, multimedia objects, and the like being generated or produced from the operation of the UE 1100.

The sensors 1110 may include devices, modules, or subsystems whose purpose is to detect events or changes in its environment and send the information (sensor data) about the detected events to some other device, module, subsystem, etc. Examples of such sensors include, inter alia, inertia measurement units including accelerometers, gyroscopes, or magnetometers; microelectromechanical systems or nanoelectromechanical systems including 3-axis accelerometers, 3-axis gyroscopes, or magnetometers; level sensors; temperature sensors (for example, thermistors); pressure sensors; image capture devices (for example, cameras or lensless apertures); light detection and ranging sensors; proximity sensors (for example, infrared radiation detector and the like); depth sensors; ambient light sensors; ultrasonic transceivers; microphones or other like audio capture devices; etc.

The driver circuitry 1112 may include software and hardware elements that operate to control particular devices that are embedded in the UE 1100, attached to the UE 1100, or otherwise communicatively coupled with the UE 1100. The driver circuitry 1112 may include individual drivers allowing other components to interact with or control various input/output (I/O) devices that may be present within, or connected to, the UE 1100. For example, driver circuitry 1112 may include a display driver to control and allow access to a display device, a touchscreen driver to control and allow access to a touchscreen interface, sensor drivers to obtain sensor readings of sensors 1110 and control and allow access to sensors 1110, drivers to obtain actuator positions of electro-mechanic components or control and allow access to the electro-mechanic components, a camera driver to control and allow access to an embedded image capture device, audio drivers to control and allow access to one or more audio devices.

The PMIC 1114 may manage power provided to various components of the UE 1100. In particular, with respect to the processors 1102, the PMIC 1114 may control power-source selection, voltage scaling, battery charging, or DC-to-DC conversion.

In some implementations, the PMIC 1114 may control, or otherwise be part of, various power saving mechanisms of the UE 1100. A battery 1118 may power the UE 1100, although in some examples the UE 1100 may be mounted deployed in a fixed location, and may have a power supply coupled to an electrical grid. The battery 1118 may be a lithium ion battery, a metal-air battery, such as a zinc-air battery, an aluminum-air battery, a lithium-air battery, and the like. In some implementations, such as in vehicle-based applications, the battery 1118 may be a typical lead-acid automotive battery.

Figure 12:
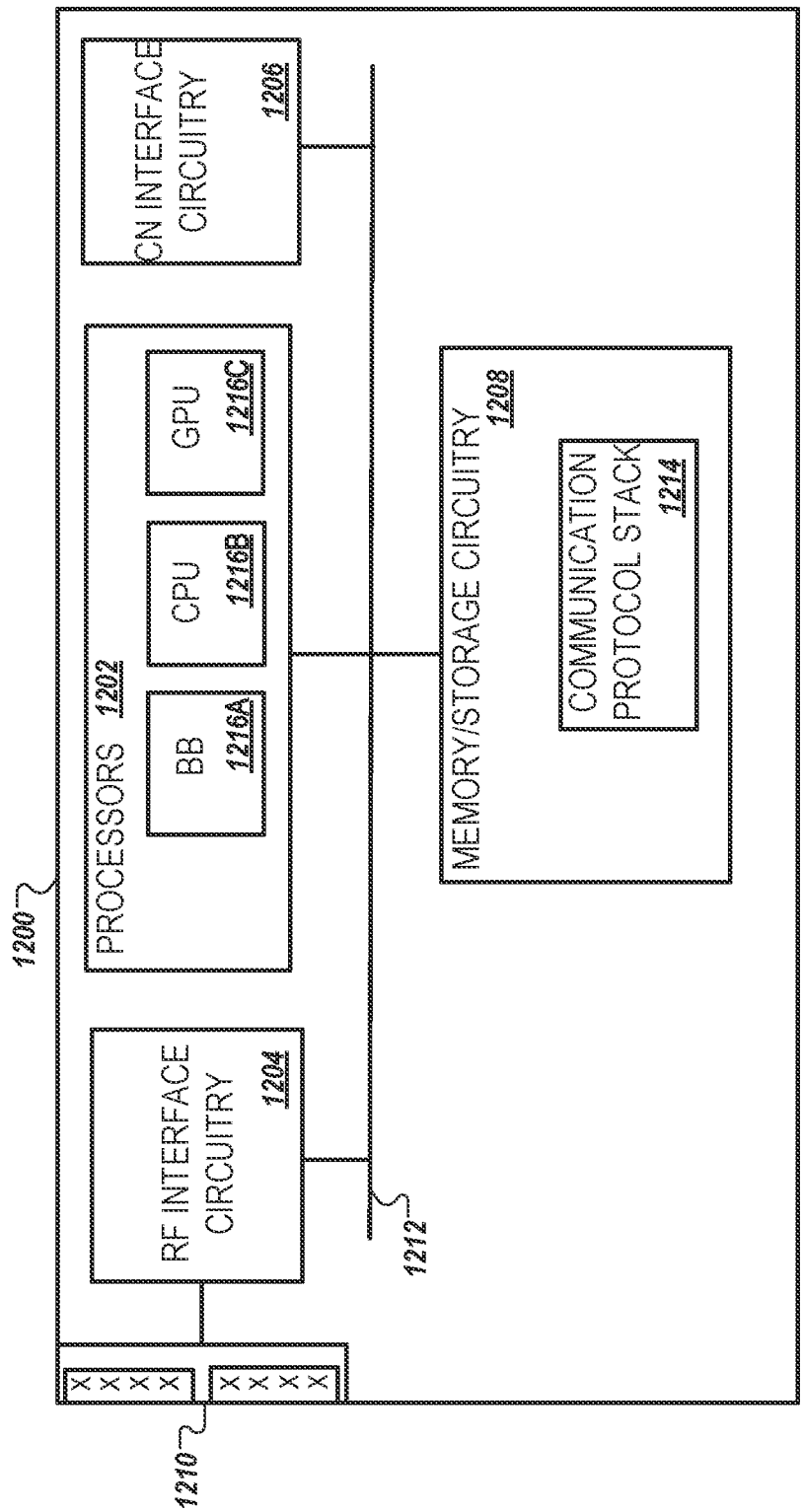
FIG. 12 illustrates an example of an access node, according to some implementations.

FIG. 12 illustrates an access node 1200 (e.g., a base station or gNB), according to some implementations. The access node 1200 may be similar to and substantially interchangeable with base station 104, intermediate node 203, or intermediate node 703. The access node 1200 may include processors 1202, RF interface circuitry 1204, core network (CN) interface circuitry 1206, memory/storage circuitry 1208, and one or more antennas 1210.

The components of the access node 1200 may be coupled with various other components over one or more interconnects 1212. The processors 1202, RF interface circuitry 1204, memory/storage circuitry 1208 (including communication protocol stack 1214), one or more antennas 1210, and interconnects 1212 may be similar to like-named elements shown and described with respect to FIG. 11. For example, the processors 1202 may include processor circuitry such as, for example, baseband processor circuitry (BB) 1216A, CPU 1216B, and GPU 1216C.

The CN interface circuitry 1206 may provide connectivity to a core network, for example, a 5th Generation Core network (5GC) using a 5GC-compatible network interface protocol such as carrier Ethernet protocols, or some other suitable protocol. Network connectivity may be provided to/from the access node 1200 via a fiber optic or wireless backhaul. The CN interface circuitry 1206 may include one or more dedicated processors or FPGAs to communicate using one or more of the aforementioned protocols. In some implementations, the CN interface circuitry 1206 may include multiple controllers to provide connectivity to other networks using the same or different protocols.

As used herein, the terms "access node," "access point," or the like may describe equipment that provides the radio baseband functions for data and/or voice connectivity between a network and one or more users. These access nodes can be referred to as BS, gNBs, RAN nodes, eNBs, NodeBs, RSUs, TRxPs or TRPs, and so forth, and can include ground stations (e.g., terrestrial access points) or satellite stations providing coverage within a geographic area (e.g., a cell). As used herein, the term "NG RAN node" or the like may refer to an access node 1200 that operates in an NR or 5G system (for example, a gNB), and the term "E-UTRAN node" or the like may refer to an access node 1200 that operates in an LTE or 4G system (e.g., an eNB). According to various implementations, the access node 1200 may be implemented as one or more of a dedicated physical device such as a macrocell base station, and/or a low power (LP) base station for providing femtocells, picocells or other like cells having smaller coverage areas, smaller user capacity, or higher bandwidth compared to macrocells.

In some implementations, all or parts of the access node 1200 may be implemented as one or more software entities running on server computers as part of a virtual network, which may be referred to as a CRAN and/or a virtual baseband unit pool (vBBUP). In V2X scenarios, the access node 1200 may be or act as a "Road Side Unit." The term "Road Side Unit" or "RSU" may refer to any transportation infrastructure entity used for V2X communications. An RSU may be implemented in or by a suitable RAN node or a stationary (or relatively stationary) UE, where an RSU implemented in or by a UE may be referred to as a "UE-type RSU," an RSU implemented in or by an eNB may be referred to as an "eNB-type RSU," an RSU implemented in or by a gNB may be referred to as a "gNB-type RSU," and the like.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

For one or more implementations, at least one of the components set forth in one or more of the preceding figures may be configured to perform one or more operations, techniques, processes, or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

In the following sections, further exemplary implementations are provided.

Example 1 is directed to a method for managing a QoE for a UE in a communications network. The method includes: determining, based at least on data received in a communications session, one or more parameters affecting the QoE; determining weights corresponding to the one or more parameters; computing an expected QoE for the UE based on the determined weights corresponding to the one or more parameters; determining that the expected QoE satisfies a threshold; transmitting, to one or more network nodes in the communications network, the determined weights corresponding to the one or more parameters; and adjusting the communications session at the UE.

Example 2 may include the method of example 1, wherein transmitting the determined weights comprises transmitting the determined weights using a format comprising at least one of XML, JSON, a binary format; or a REST format.

Example 3 may include the method of example 1, wherein the one or more network nodes comprise an intermediate node and an end device, wherein the communications session is between the UE and the end device, and wherein the determined weights corresponding to the one or more parameters are received from the UE at the intermediate node and forwarded by the intermediate node to the end device.

Example 4 may include the method of example 3, wherein the end device comprises one of: another UE or a server.

Example 5 may include the method of example 3, further comprising: receiving, from the end device, information about an updated QoE, wherein adjusting the communications session is based at least on the information about the updated QoE.

Example 6 may include the method of example 5, wherein the updated QoE is calculated by the end device based on one or more of: the determined weights corresponding to the one or more parameters, or updated weights corresponding to the one or more parameters, the updated weights being determined by at least the intermediate node.

Example 7 may include the method of example 6, wherein the updated QoE is calculated by the end device further based at least on: one or more new parameters; and new weights corresponding to the one or more new parameters, wherein the one or more new parameters and the corresponding new weights are determined by at least one of the intermediate node or the end device.

Example 8 may include the method of example 1, wherein the one or more parameters comprise at least one of: availability of a computation resource of the UE; memory usage at the UE; or network quality of a network connection between the UE and the one or more network nodes in the communications network.

Example 9 may include the method of example 1, wherein the determined weights are transmitted to the one or more network nodes using a plurality of sequential transmissions Example 10 may include the method of example 3, wherein the intermediate node comprises an access node in the communications network Example 11 may include the method of example 5, further comprising executing an application that controls the communications session, wherein adjusting the communications session comprises: adjusting characteristics of the application based on the updated QoE Example 12 may include the method of example 5, wherein the updated QoE is calculated by the intermediate node based on one or more of: the determined weights corresponding to the one or more parameters, updated weights corresponding to the one or more parameters determined by the intermediate node, or one or more new parameters and new weights corresponding to the one or more new parameters determined by the intermediate node.

Example 13 is directed to a processor having circuitry that executes instructions to cause a network node to perform operations, the operations comprising: receiving, from a UE that communicates with the network node in a communications network, one or more weights corresponding to one or more parameters, wherein the one or more parameters affect a QoE for the UE during a communications session with an end device; determining, based at least on a condition of the network node, updated weights corresponding to the one or more parameters; and transmitting the updated weights corresponding to the one or more parameters to the end device.

Example 14 may include the processor of example 13, wherein the one or more weights are received in a format comprising one or more of: XML, JSON, a binary format, or a REST format.

Example 15 may include the processor of example 13, wherein the operations further comprise: determining one or more new parameters and new weights corresponding to the one or more new parameters, and transmitting, to the end device, the new weights corresponding to the one or more new parameters.

Example 16 may include the processor of example 13, wherein the one or more parameters comprise at least one of: availability of a computation resource of the UE, memory usage at the UE, or network quality of a network connection between the UE and the one or more network nodes in the communications network.

Example 17 may include the processor of example 13, wherein the operations further comprise: prior to transmitting the updated weights to the end device, converting a format of the updated weights.

Example 18 may include the processor of example 17, wherein the format of the updated weights is converted according to at least one of: NEF or SCEF.

Example 19 may include the processor of example 13, wherein the operations further comprise determining an updated QoE for the UE based on at least one of: the updated weights corresponding to the one or more parameters, or one or more new parameters and new weights corresponding to the one or more new parameters.

Example 20 is directed to a UE in a communications network, the UE comprising a processor configured to: determine, based at least on data received in a communications session, one or more parameters affecting QoE of the UE; determine weights corresponding to the one or more parameters; compute an expected QoE for the UE based on the determined weights corresponding to the one or more parameters; determine that the expected QoE satisfies a threshold; cause transmission, to one or more network nodes in the communications network, the determined weights corresponding to the one or more parameters; and adjust the communications session at the UE.

Example 21 may include the UE of example 20, further comprising a transceiver that transmits the determined weights using a format comprising one or more of: XML, JSON, a binary format, or a REST format.

Example 22 may include the UE of example 20, wherein the one or more network nodes comprise an intermediate node and an end device, wherein the communications session is between the UE and the end device, and wherein the determined weights corresponding to the one or more parameters are received from the UE at the intermediate node and forwarded by the intermediate node to the end device.

Example 23 may include the UE of example 20, wherein the processor is further configured to: cause reception, from the end device, information about an updated QoE, and adjust the communications session based at least on the information about the updated QoE.

Example 24 may include the UE of example 23, wherein the updated QoE is calculated by the end device based on at least one of: the determined weights corresponding to the one or more parameters, or updated weights corresponding to the one or more parameters, the updated weights being determined by at least the intermediate node.

Example 25 may include the UE of example 24, wherein the updated QoE is calculated by the end device further based at least on one or more new parameters and new weights corresponding to the one or more new parameters, and wherein the one or more new parameters and the corresponding new weights are determined by at least one of the intermediate node or the end device.

Example 26 may include the UE of example 19, wherein the one or more parameters comprise at least one of: availability of a computation resource of the UE, memory usage at the UE, or network quality of a network connection between the UE and the one or more network nodes in the communications network.

Example 27 may include the UE of example 19, wherein the determined weights are transmitted to the one or more network nodes using a plurality of sequential transmissions.

Example 28 may include the UE of example 12, wherein the processor is configured to execute an application that controls the communications session, and wherein adjusting the communications session comprises: adjusting characteristics of the application based on the updated QoE.

Example 29 may include the UE of example 23, wherein the updated QoE is calculated by the intermediate node based on one or more of: the determined weights corresponding to the one or more parameters, updated weights corresponding to the one or more parameters determined by the intermediate node, or one or more new parameters and new weights corresponding to the one or more new parameters determined by the intermediate node.

Example 30 is directed to a method for managing a QoE for a UE in a communications network, the method comprising: receiving, from the UE, one or more weights corresponding to one or more parameters, wherein the one or more parameters affect a QoE of the UE during a communications session with an end device; determining, based at least on a condition of a network node, updated weights corresponding to the one or more parameters, wherein the network node is configured to communicably couple the UE to the end device for the communications session; and transmitting, to the end device, the updated weights corresponding to the one or more parameters.

Example 31 may include the method of example 30, wherein the one or more weights are received in a format comprising one or more of: XML, JSON, a binary format, or a REST format.

Example 32 may include the method of example 30, further comprising: determining one or more new parameters and new weights corresponding to the one or more new parameters; and transmitting, to the end device, the new weights corresponding to the one or more new parameters.

Example 33 may include the method of example 30, wherein the one or more parameters comprise at least one of: availability of a computation resource of the UE, memory usage at the UE, or network quality of a network connection between the UE and the one or more network nodes in the communications network.

Example 34 may include the method of example 30, further comprising: prior to transmitting the updated weights to the end device, converting a format of the updated weights.

Example 35 may include the method of example 34, wherein converting the format of the updated weights is according to at least one of: NEF or SCEF.

Example 36 may include the method of example 30, further comprising: determining an updated QoE for the UE based on at least one of: the updated weights corresponding to the one or more parameters, or one or more new parameters and new weights corresponding to the one or more new parameters.

Example 37 is directed to an end device comprising a processor configured to: cause the end device to communicate with a UE in a communications network that comprises one or more network nodes; cause the end device to receive, from the one or more network nodes, one or more weights corresponding to one or more parameters, wherein the one or more parameters affect a QoE of the UE; calculate a QoE value based at least on the one or more parameters and the corresponding weights; determine an adjustment to the QoE of the UE based at least on the QoE value; and adjust a communications session between the end device and the UE based at least on the adjustment to the QoE.

Example 38 may include the end device of example 37, wherein the one or more parameters comprise at least one of: availability of a computation resource of the UE, memory usage at the UE, or network quality of a network connection between the UE and the one or more network nodes in the communications network.

Example 39 may include the end device of example 37, wherein the one or more parameters comprise one or more new parameters determined by the one or more network nodes.

Example 40 may include the end device of example 37, wherein the one or more parameters are received in a format comprising at least one of: NEF or SCEF.

Example 41 is directed to a method for managing a QoE for a UE in a communications network, the method comprising: receiving, by an end device and from one or more network nodes in the communications network, one or more weights corresponding to one or more parameters, wherein the one or more parameters affect a QoE of the UE; calculating a QoE value based at least on the one or more parameters and the corresponding weights; determining an adjustment to the QoE of the UE based at least on the QoE value; and adjusting a communications session between the end device and the UE based at least on the adjustment to the QoE.

Example 42 may include the method of claim 41, wherein the one or more parameters comprise at least one of: availability of a computation resource of the UE, memory usage at the UE, or network quality of a network connection between the UE and the one or more network nodes in the communications network.

Example 43 may include the method of claim 41, wherein the one or more parameters comprise one or more new parameters determined by the one or more network nodes.

Example 44 may include the method of claim 41, wherein the one or more parameters are received in a format comprising at least one of: NEF or SCEF.

The previously-described examples 1-44 are implementable using a computer-implemented method; a non-transitory, computer-readable medium storing computer-readable instructions to perform the computer-implemented method; and a computer system including a computer memory interoperably coupled with a hardware processor configured to perform the computer-implemented method or the instructions stored on the non-transitory, computer-readable medium.

A system can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. The operations or actions performed either by the system or by the instructions executed by data processing apparatus can include the methods of any one of examples 1-20.

Any of the above-described examples may be combined with any other example (or combination of examples), unless explicitly stated otherwise. The foregoing description of one or more implementations provides illustration and description, but is not intended to be exhaustive or to limit the scope of implementations to the precise form disclosed. Modifications and variations are possible in light of the above teachings or may be acquired from practice of various implementations.

Although the implementations above have been described in considerable detail, numerous variations and modifications will become apparent to those skilled in the art once the above disclosure is fully appreciated. It is intended that the following claims be interpreted to embrace all such variations and modifications.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

What is claimed is:

1. A method comprising:
   determining, based at least on data received in a communications session, one or more parameters affecting quality of experience (QoE) for a user equipment (UE);
   determining weights corresponding to the one or more parameters;
   computing an expected QoE for the UE based on the determined weights corresponding to the one or more parameters;
   determining that the expected QoE satisfies a threshold;
   outputting, for transmission to one or more network nodes in a communications network, the determined weights corresponding to the one or more parameters; and
   adjusting the communications session based at least on an updated QoE that is computed using one or more new parameters and corresponding weights determined by the one or more network nodes in the communications network.

2. The method of claim 1, wherein outputting the determined weights comprises outputting the determined weights using a format comprising one or more of:
   Extensible Markup Language (XML),
   JavaScript Object Notation (JSON),
   a binary format, or
   a Representational State Transfer (REST) format.

3. The method of claim 1, wherein:
   the one or more network nodes comprise an intermediate node and an end device,
   the communications session is between the UE and the end device, and
   the determined weights corresponding to the one or more parameters are received from the UE at the intermediate node and forwarded by the intermediate node to the end device.

4. The method of claim 3, wherein the end device comprises at least one of another UE or a server.

5. The method of claim 3, further comprising:
   receiving, from the end device, information about an updated QoE,
   wherein adjusting the communications session is based at least on the information about the updated QoE.

6. The method of claim 5, wherein the updated QoE is calculated by the end device based on one or more of:
   the determined weights corresponding to the one or more parameters, or
   updated weights corresponding to the one or more parameters, the updated weights being determined by at least the intermediate node.

7. The method of claim 6, wherein:
   the updated QoE is calculated by the end device; and
   the one or more new parameters and corresponding weights are determined by at least one of the intermediate node or the end device.

8. The method of claim 5, further comprising executing an application that controls the communications session, wherein adjusting the communications session comprises:
   adjusting characteristics of the application based on the updated QoE.

9. The method of claim 5, wherein the updated QoE is calculated by the intermediate node based on one or more of:
   the determined weights corresponding to the one or more parameters,
   updated weights corresponding to the one or more parameters determined by the intermediate node, or
   the one or more new parameters and corresponding weights.

10. The method of claim 3, wherein the intermediate node comprises an access node in the communications network.

11. The method of claim 1, wherein the one or more parameters comprise at least one of:
    availability of a computation resource of the UE,
    memory usage at the UE, or
    network quality of a network connection between the UE and the one or more network nodes in the communications network.

12. The method of claim 1, wherein the determined weights are transmitted to the one or more network nodes using a plurality of sequential transmissions.

13. One or more processors comprising circuitry configured to perform operations comprising:
    receiving, from a user equipment (UE) that communicates with a network node in a communications network, one or more weights corresponding to one or more parameters, wherein the one or more parameters affect Quality of Experience (QoE) for the UE during a communications session between the UE and an end device;
    determining, based at least on a condition of the network node, updated weights corresponding to the one or more parameters; and
    transmitting outputting the updated weights corresponding to the one or more parameters for transmission to the end device.

14. The one or more processors of claim 13, wherein the one or more weights are received in a format comprising one or more of:
    Extensible Markup Language (XML),
    JavaScript Object Notation (JSON),
    a binary format, or
    a Representational State Transfer (REST) format.

15. The one or more processors of claim 13,
    wherein the operations further comprise:
    determining one or more new parameters and new weights corresponding to the one or more new parameters, and transmitting, to the end device, the new weights corresponding to the one or more new parameters.

16. The one or more processors of claim 13, wherein the one or more parameters comprise at least one of:
availability of a computation resource of the UE,
memory usage at the UE, or
network quality of a network connection between the UE and the one or more network nodes in the communications network.

17. The one or more processors of claim 13, wherein the operations further comprise: prior to transmitting the updated weights to the end device, converting a format of the updated weights.

18. The one or more processors of claim 17, wherein the format of the updated weights is converted according to at least one of:
Network Exposure Functions (NEF), or
Service Capability Exposure Functions (SCEF).

19. The one or more processors of claim 13, wherein the operations further comprise determining an updated QoE for the UE based on at least one of:
the updated weights corresponding to the one or more parameters, or
one or more new parameters and new weights corresponding to the one or more new parameters.

20. A user equipment (UE) comprising one or more processors configured to:
determine, based at least on data received in a communications session, one or more parameters affecting Quality of Experience (QoE) for the UE;
determine weights corresponding to the one or more parameters;
compute an expected QoE for the UE based on the determined weights corresponding to the one or more parameters;
determine that the expected QoE satisfies a threshold;
output, for transmission to one or more network nodes in a communications network, the determined weights corresponding to the one or more parameters; and
adjust the communications session based at least on an updated QoE that is computed using one or more new parameters and corresponding weights determined by the one or more network nodes of the communications network.

* * * * *

UNITED STATES PATENT AND TRADEMARK OFFICE
CERTIFICATE OF CORRECTION

PATENT NO. : 12,224,920 B2
APPLICATION NO. : 18/244947
DATED : February 11, 2025
INVENTOR(S) : Sarma V. Vangala et al.

Page 1 of 1

It is certified that error appears in the above-identified patent and that said Letters Patent is hereby corrected as shown below:

In the Claims

Column 24, Line 53, In Claim 13, before "outputting" delete "transmitting".

Signed and Sealed this
Eighth Day of April, 2025

Coke Morgan Stewart
*Acting Director of the United States Patent and Trademark Office*